US005850075A

United States Patent [19]

Brannan et al.

[11] Patent Number: 5,850,075

[45] Date of Patent: Dec. 15, 1998

[54] RECEIPT TRANSPORT AND RETRIEVAL SYSTEM FOR AUTOMATED BANKING MACHINE

[75] Inventors: Jeffrey A. Brannan, Canton, Ohio; Tuyen Van Pham, Lexington, Ky.

[73] Assignee: InterBold, North Canton, Ohio

[21] Appl. No.: 827,569

[22] Filed: Mar. 28, 1997

Related U.S. Application Data

[60] Provisional application No. 60/031,501 Nov. 27, 1996.

[51] Int. Cl.[6] ............................ B65G 59/00; B65H 5/26; B65H 9/16

[52] U.S. Cl. ........................... 235/379; 235/475; 902/18; 271/907

[58] Field of Search .................................... 235/379, 475, 235/380, 381, 483, 486; 902/12, 14, 15, 18; 271/225, 902; 209/657

[56] References Cited

U.S. PATENT DOCUMENTS

| | | | |
|---|---|---|---|
| 4,253,016 | 2/1981 | Hirose | 235/475 |
| 4,373,713 | 2/1983 | Loebach | 271/303 |
| 4,456,234 | 6/1984 | Simonotti et al. | 902/18 |
| 4,605,217 | 8/1986 | Goi | 902/15 |
| 4,814,825 | 3/1989 | Johdai et al. | 271/902 |
| 4,817,934 | 4/1989 | McCormick et al. | 271/296 |
| 4,842,263 | 6/1989 | Robertson | 271/902 |
| 4,905,841 | 3/1990 | Hirata et al. | 235/379 |
| 4,919,027 | 4/1990 | Littleton | 83/107 |
| 4,928,230 | 5/1990 | Kawamura et al. | 235/379 |
| 4,953,846 | 9/1990 | Azeta et al. | 271/902 |
| 4,969,640 | 11/1990 | Littleton | 271/82 |
| 4,991,829 | 2/1991 | Fischer et al. | 902/15 |
| 5,000,322 | 3/1991 | Goi | 235/379 |
| 5,004,220 | 4/1991 | Dreschel et al. | 271/225 |
| 5,017,026 | 5/1991 | Takesako et al. | 235/379 |
| 5,021,639 | 6/1991 | Hara et al. | 235/379 |
| 5,101,979 | 4/1992 | Uno et al. | 235/379 |
| 5,136,144 | 8/1992 | Swinton et al. | 235/475 |
| 5,168,150 | 12/1992 | Plouzennec et al. | 235/475 |
| 5,186,334 | 2/1993 | Fukudome et al. | 235/379 |
| 5,258,045 | 11/1993 | Yamashita | 271/225 |
| 5,340,099 | 8/1994 | Romanenko et al. | 209/657 |
| 5,340,100 | 8/1994 | Romanenko | 209/657 |
| 5,422,467 | 6/1995 | Graef et al. | 235/379 |
| 5,472,185 | 12/1995 | Kollan et al. | 271/303 |
| 5,540,544 | 7/1996 | Sacerdoti et al. | 271/902 |
| 5,673,333 | 9/1997 | Johnston | 235/379 |
| 5,697,517 | 12/1997 | Hollan-Letz | 235/379 |
| 5,718,426 | 2/1998 | Youn | 271/225 |
| 5,722,652 | 3/1998 | Yoshida et al. | 271/225 |

*Primary Examiner*—Anita Pellman Gross
*Assistant Examiner*—Douglas X. Rodriquez
*Attorney, Agent, or Firm*—Ralph E. Jocke

[57] ABSTRACT

An automated banking machine (10) includes a receipt transport and retracting apparatus (26). The machine includes a printer (30) which delivers a sheet (108) which is a transaction receipt for a transaction conducted at the machine. The sheet is transported in engaged relation with the lower flights of two transversely disposed belts (50, 52). A gate member (76) is positioned adjacent to the printer and is rotatably mounted. The gate member includes slots (78) which extend transversely between the arcuate outside surface (86) and inside surface (88) of the gate member. In the first position of the gate member the belt flights extend through the slots. Engagement of a sheet moving in an outward direction from the printer toward an outlet (118) moves the gate member to a second rotational position in which the sheet passes the gate member. The sheet moves in the outward direction until it reaches the outlet and extends through an opening (24) where it is accessible to a user. If a user fails to take the sheet, the belts move the sheet in an opposed direction. The sheet moves in the opposed direction and engages the inside surface of the gate member and is directed to a storage location (80) inside the machine.

59 Claims, 23 Drawing Sheets

RECEIPT TRANSPORT AND RETRIEVAL SYSTEM FOR AUTOMATED BANKING MACHINE

This application claims the benefit of U.S. Provisional Application Ser. No. 60/031,501 filing date, Nov. 27, 1996.

TECHNICAL FIELD

This invention relates to automated banking machines. Specifically this invention relates to a transport and retrieval system for transaction receipts or other sheets delivered to a user operating an automated banking machine.

BACKGROUND ART

Automated banking machines are well known in the prior art. Automated banking machines may include automated teller machines (ATMs) through which consumers may conduct banking transactions. Other types of automated banking machines include devices which count or deliver cash or other items of value to a consumer, bank teller or other user, as well as point of sale (POS) terminals and other terminals which enable users to carry out transactions of value.

It is common for automated banking machines to provide the user with a printed receipt which documents each transaction. The receipts typically show the type of transaction and the value or amount involved. Other information may also be included on the receipt depending on the type of automated banking machine. Receipts may include information such as the user's name, the time of day, the location where the transaction was conducted and an account balance. Receipts may also include the user's card number and an account number of a user's account.

Often users of automated banking machines are in a hurry and forget to take the receipt after conducting a transaction. When this occurs the receipt typically remains extending outward from a receipt delivery opening in the machine until a next transaction is conducted and another receipt is provided. The subsequent receipt typically pushes the prior receipt out from the delivery opening and the prior receipt falls to the ground or on the floor adjacent to the machine.

In the case of automated teller machines, customers very often fail to take their receipt. This results in an unsightly litter problem in the area of the machine. The operators of such machines have to frequently clean up the area to keep it suitable for customers.

Failure to take a transaction receipt may also pose other problems. Specifically receipts may contain information and can be utilized by criminals. This information may include account numbers and balances which may be used for illicit purposes.

With the increased acceptance of automated banking machines, it is now often possible to print more information on transaction receipts. Often this information is of a private nature which users would not wish to have disclosed. While the provision of such information is of value to users who consistently take and review their receipts, consumers who do not run increased risks.

Systems have been devised for capturing currency and credit or debit cards which users fail to retrieve from an automated banking machine. However, mechanisms for retrieving such items are often complex and expensive. Such mechanisms also take up the limited space available inside an automated banking machine. While such retrieval systems are justified with regard to items of high value such as currency and credit and debit cards, such mechanisms have not been justified with respect to receipts.

There are also different types of receipt forms that have been used in automated banking machines. Certain machines use pre-printed forms with a predefined format. Such forms are always the same size when delivered to the user of a banking machine. Such forms commonly include pre-printed information such as the name of a financial institution. Such forms include a "top of form" (TOF) indicator which is a mark on each form which serves as a guide for printing on the forms as well as for separating the forms. The nature of TOF indicators may vary between form types and suppliers. As a result, a change in forms may necessitate adjustment of the machine to properly sense the TOF indicator on the new form type.

Other automated banking machines use plain roll paper for printing receipts. Generally the roll paper does not include pre-printed information. The color and quality of plain roll paper can vary. If the type of roll paper is changed the machine may require to readjustment to properly detect and handle the new type of paper.

Automated banking machines which handle pre-printed forms with TOF indicators generally do not handle plain roll paper receipts and vice versa. Therefore an operator of an automated banking machine is limited to using the form type for which the machine is made.

Thus there exists a need for a receipt transport and retrieval system for an automated banking machine that retrieves a transaction receipt that is delivered but not taken by a user and stores the receipt in the machine. There further exists a need for such a transport and retrieval system that is reliable, compact and low in cost. There further exists a need for such a system that is suitable for use with receipts which vary in type and paper quality.

DISCLOSURE OF INVENTION

It is an object of the present invention to provide a receipt transport and retrieval system for an automated banking machine that delivers a receipt to a user.

It is a further object of the present invention to provide a receipt transport and retrieval system for an automated banking machine that retrieves receipts that have been delivered to a user but not taken.

It is a further object of the present invention to provide a receipt transport and retrieval system for an automated banking machine that stores receipts that are not taken by a user in a secure location in an interior area of the machine.

It is a further object of the present invention to provide a receipt transport and retrieval system for an automated banking machine that is simple and reliable in construction.

It is a further object of the present invention to provide a receipt transport and retrieval system for an automated banking machine that is small and compact.

It is a further object of the present invention to provide a receipt transport and retrieval system for an automated banking machine that is low in cost.

It is a further object of the present invention to provide a sheet transport for delivering a sheet from a sheet source to an outlet.

It is a further object of the present invention to provide a sheet transport and retrieval system that retrieves a sheet that is not taken.

It is a further object of the present invention to provide a sheet transport and retrieval system that can handle receipt forms of varied types and sizes.

It is a further object of the present invention to provide a sheet transport and retrieval system that can handle receipt forms having varied paper color and quality.

It is a further object of the present invention to provide a method for delivering sheets to an outlet and retrieving untaken sheets therefrom.

It is a further object of the present invention to provide a method for transporting and delivering receipts to a user operating an automated banking machine.

It is a further object of the present invention to provide a method for transporting and delivering receipts to a user operating an automated banking machine, which receipts comprise forms of various types and sizes and which forms have varied paper qualities.

It is a further object of the present invention to provide a method for retrieving a receipt that has been delivered but not taken by a user of an automated banking machine.

It is a further object of the present invention to provide a method for storing retrieved receipts in the interior of an automated banking machine and for periodically removing the retrieved sheets.

Further objects of the present invention will be made apparent in the following Best Mode For Carrying Out Invention and the appended claims.

The foregoing objects are accomplished in a preferred embodiment to the present invention by a transaction receipt transport and retrieval system in an automated banking machine which includes a sheet source in an interior area of the machine. The sheet source delivers a sheet which comprises a transaction receipt. The source is typically a printer device that prints indicia on the form sheet responsive to the transactions conducted at the machine. The system also includes an outlet from which the user may take a sheet that has been delivered.

The system includes a movable belt flight or other drive mechanism that extends inside the machine between the sheet source and the outlet. A gate member is positioned in intermediate relation between the source and the outlet. The gate member preferably has an arcuate profile in cross-section and is rotatably mounted adjacent to the belt flight and the sheet source.

The gate member in cross-section includes an arcuate outside surface and an arcuate inside surface. The outside and inside surfaces terminate adjacent an edge. A slot extends transversely in both the outside and inside surfaces. In a first rotational position of the gate member the belt flight extends through the slot.

A storage location extends in the interior of the machine intermediate of the gate member and the outlet, and is transversely disposed from the belt flight. The storage location is suitable for housing numerous receipts which have not been taken by users.

In operation the printer produces a transaction receipt form which is a paper sheet. The belt flight moves in an outward direction towards the outlet responsive to the production of the sheet. The sheet extends adjacent to the outside surface of the gate member and is engaged in a nip formed by the belt flight extending through the slot in the gate member. The engagement of the sheet pulls the sheet in the outward direction in engaged relation with the belt flight.

The force of the engaged sheet acting on the gate member causes the gate member to rotate to a second position. In the second position the sheet is enabled to pass the gate member moving in an outward direction. Once the sheet passes the gate member, the gate member returns to the first position from the second position responsive to the force of gravity due to the weight distribution of the gate member. The sheet is delivered to the outlet where it extends through an opening in a fascia of the machine and is accessible to a user.

The machine includes a controller circuit and sensors which include a timer. If the user fails to take the transaction receipt from the outlet within a set time, the belt flight begins moving in an opposed inward direction.

The belt flight carries the receipt in the inward direction in engagement therewith until it reaches the gate member. The inside surface of the gate member engages the receipt and prevents it from reaching the sheet source. The inside surface of the gate member directs the sheet in supported relation therewith into the storage location. The sheet transport is then ready to deliver further sheets.

The present invention further provides for the ready removal of accumulated transaction receipts from the storage location. This is achieved by having the belt flight and gate member pivotally movable so as to enable ready accessing of the storage location during servicing.

The controller circuit of the preferred embodiment of the present invention is adapted to enable handling receipt forms of the pre-printed variety which include a top of form (TOF) indicator, as well as plain paper receipts. The preferred embodiment is also self-adjusting to accommodate changes in paper color and quality. The preferred embodiment further enables printing of receipts of varied size and is operative to clear malfunctions that may occur, such as paper jams.

BEST MODE FOR CARRYING OUT INVENTION

Figure 1:
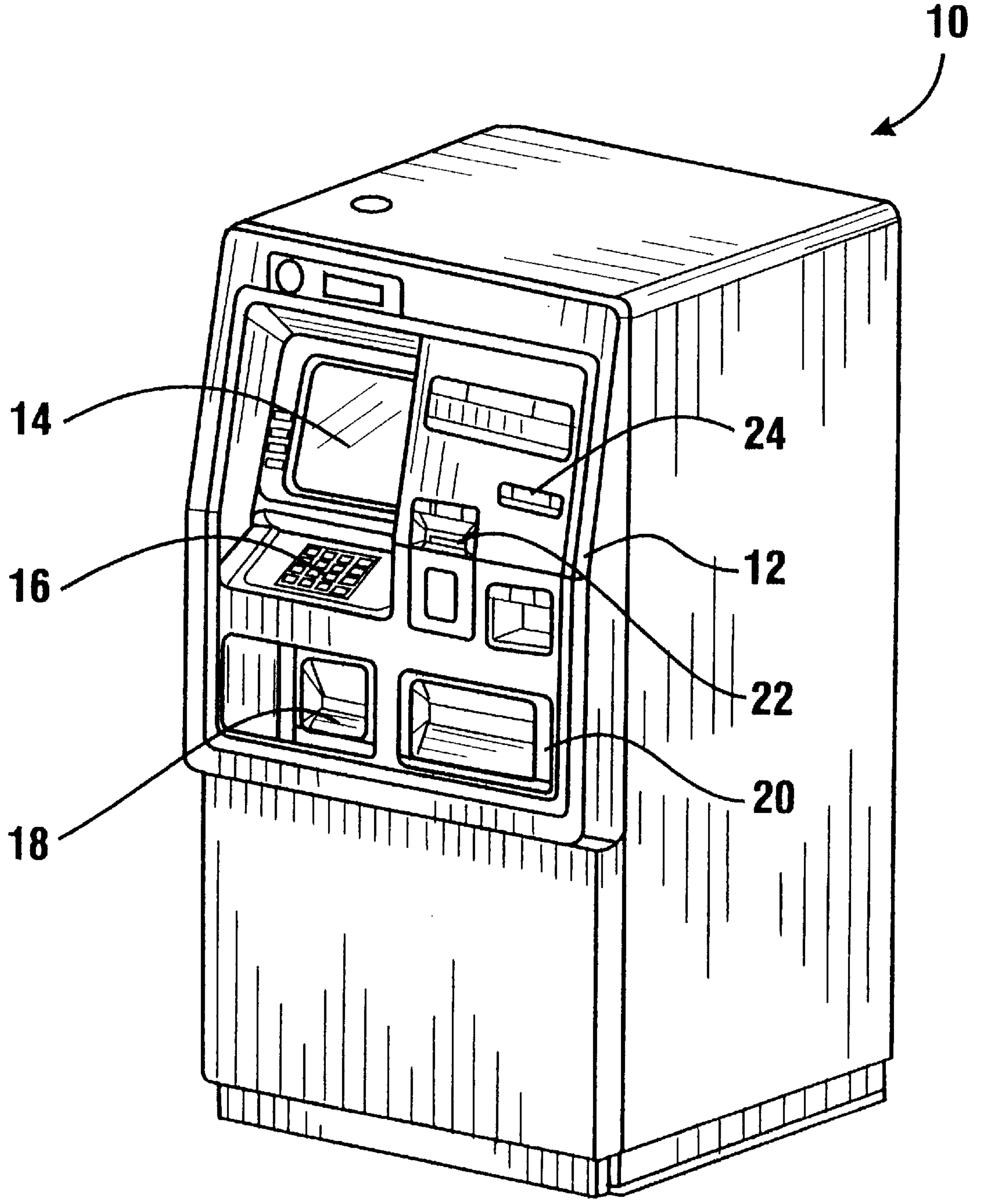
FIG. 1 is an isometric view of an automated banking machine.

Referring now to the drawings and particularly to FIG. 1, there is shown therein an isometric view of an automated banking machine generally indicated 10. Automated banking machine 10 is an automated teller machine. However, it should be understood that the present invention may be used in other types of automated banking machines including currency counting units, currency acceptors, scrip terminals, POS terminals and similar type devices.

Automated banking machine 10 includes a fascia 12 which includes a user interface. The fascia includes an opening through which a screen 14 may be viewed. A screen is used for providing instructions and delivering messages to the user. The fascia also has thereon a keyboard 16 through which the user may enter instructions.

The fascia also includes openings for other types of devices and mechanisms. In the embodiment shown these include a depository opening 18 into which a user may place deposits. A currency delivery opening 20 is also provided through which currency is delivered to the user. The fascia also includes a card entry slot 22 wherein a user inputs a debit or credit card which is used to initiate operation of the machine. The fascia also includes a receipt delivery opening 24 through which transaction receipts are delivered to the user.

Figure 2:
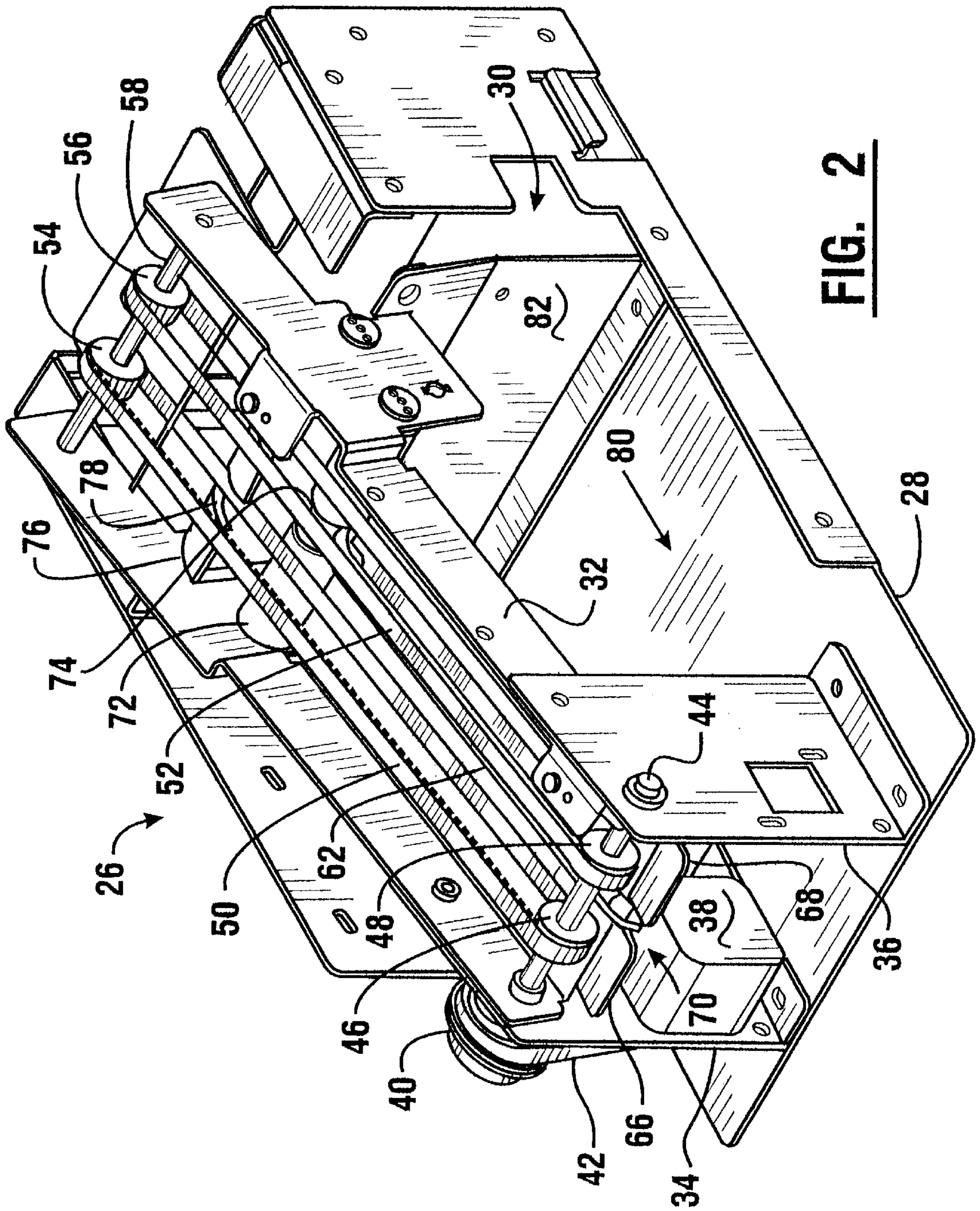
FIG. 2 is an isometric view of the receipt transport and retrieval apparatus of a preferred embodiment of the present invention.

The sheets which comprise the customer receipts are delivered to receipt opening 24 by the transport and retrieval apparatus generally indicated 26 in FIG. 2. Apparatus 26 includes a base 28 which is supported in an interior area of machine 10. Base 28 supports thereon a sheet source, which in the preferred form of the invention is a transaction receipt printer 30 (see FIG. 3). Printer 30 is preferably a conventional type receipt printer which prints receipts on sheets using thermal, dot matrix, ink jet, laser or other printing techniques. The printer also preferably is fed from a continuous roll or a fan-fold stack of paper. The printer also preferably includes a cut-off device for cutting sheets and separating them after the receipt information has been printed thereon. The present invention may be used to produce receipts of uniform length or of varied lengths. The preferred embodiment of the present invention is also specifically adapted for use with either pre-printed type form receipts or plain paper-type receipts.

Apparatus 26 further includes a frame 32. Frame 32 is supported and rotatably mounted on a pair of uprights 34 and 36. Upright 34 supports a drive which includes a motor 38 which is operable to drive a pulley 40 through a belt 42. Pulley 40 in turn is connected to a shaft 44. Frame 32 is supported on and rotatably movable about shaft 44.

Figure 12:
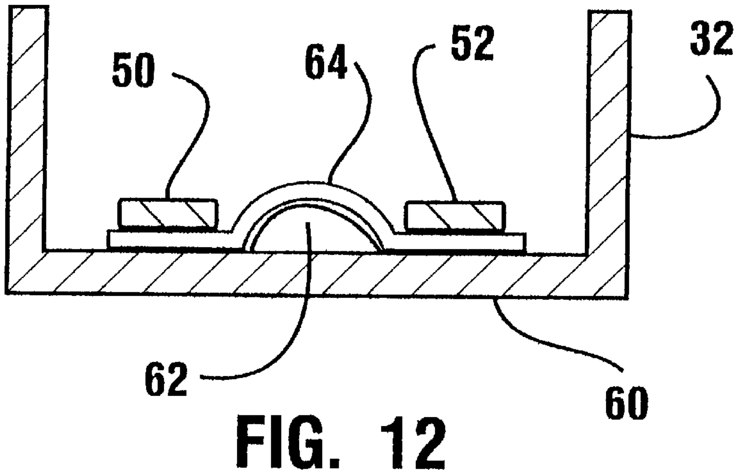
FIG. 12 is a cross-sectional end view of a frame and belt flights moving a sheet in the apparatus of the present invention.

A pair of pulleys 46 and 48 are mounted on shaft 44. Pulleys 46 and 48 operate to drive a pair of transversely spaced belts 50 and 52 respectively. Belts 50 and 52 are continuous belts which extend about pulleys 54 and 56. Pulleys 54 and 56 are mounted on a shaft 58 at an opposed end of frame 32 from shaft 44. As best shown in FIG. 12, frame 32 in cross-section includes a lower wall 60. The inside surface of lower wall 60 includes an upward extending supporting projection 62 thereon. As shown in FIG. 12 a sheet 64 may be transported in engaged relation with lower flights of belts 50 and 52 and supporting projection 62. This arrangement provides for reliable transport of sheets with limited controlled slippage.

As shown in FIG. 2, lower wall 60 of transport 32 includes upturned end projections 66 and 68. End projections 66 and 68 include an opening 70 therebetween. Supporting projection 62 extends downward in opening 70.

Figure 3:
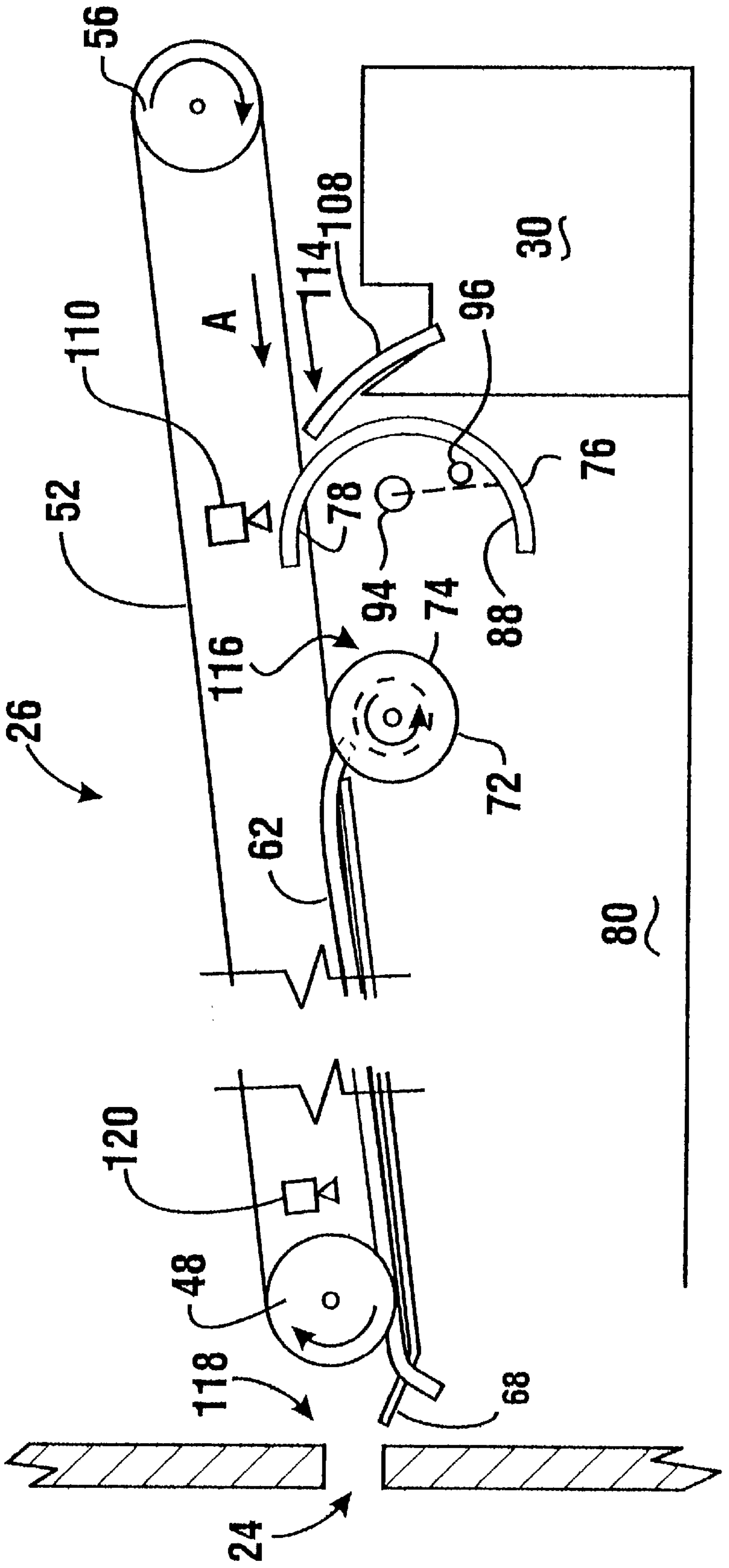
FIG. 3 is a schematic side view of the apparatus shown in FIG. 2 with the gate member in a first position.

Frame 32 further has supported thereon a roller 72 which serves as a supporting member. Roller 72 is free-wheeling and is generally engaged with the lower flights of belts 50 and 52. Roller 72 further includes a central recess 74 as shown in FIG. 3. Supporting projection 62 extends downwardly in recess 74.

A gate member 76 is rotatably mounted in supported relation on frame 32. Gate member 76 is shown in greater detail in FIGS. 9, 10, and 11. Gate member 76 includes a pair of slots 78 therein. The lower belt flights of belts 50 and 52 each extend in a slot 78 when gate member 76 is in the position shown in FIG. 2.

A storage location or bin generally indicated 80 is positioned generally below frame 32 in the operative position of the transport and retrieval apparatus shown on FIG. 2. Frame 32 is supported in the operative position by member 82, which is attached to base 28. As shown in FIG. 2, member 82 limits the downward rotation of frame 32 about shaft 44. An electrical switch is provided to sense when the frame is in the downward position in which the transport is operative to deliver sheets. It should be further noted that member 82 is configured to direct sheets produced by printer 30 toward the lower belt flights and gate member 76.

Figure 9:
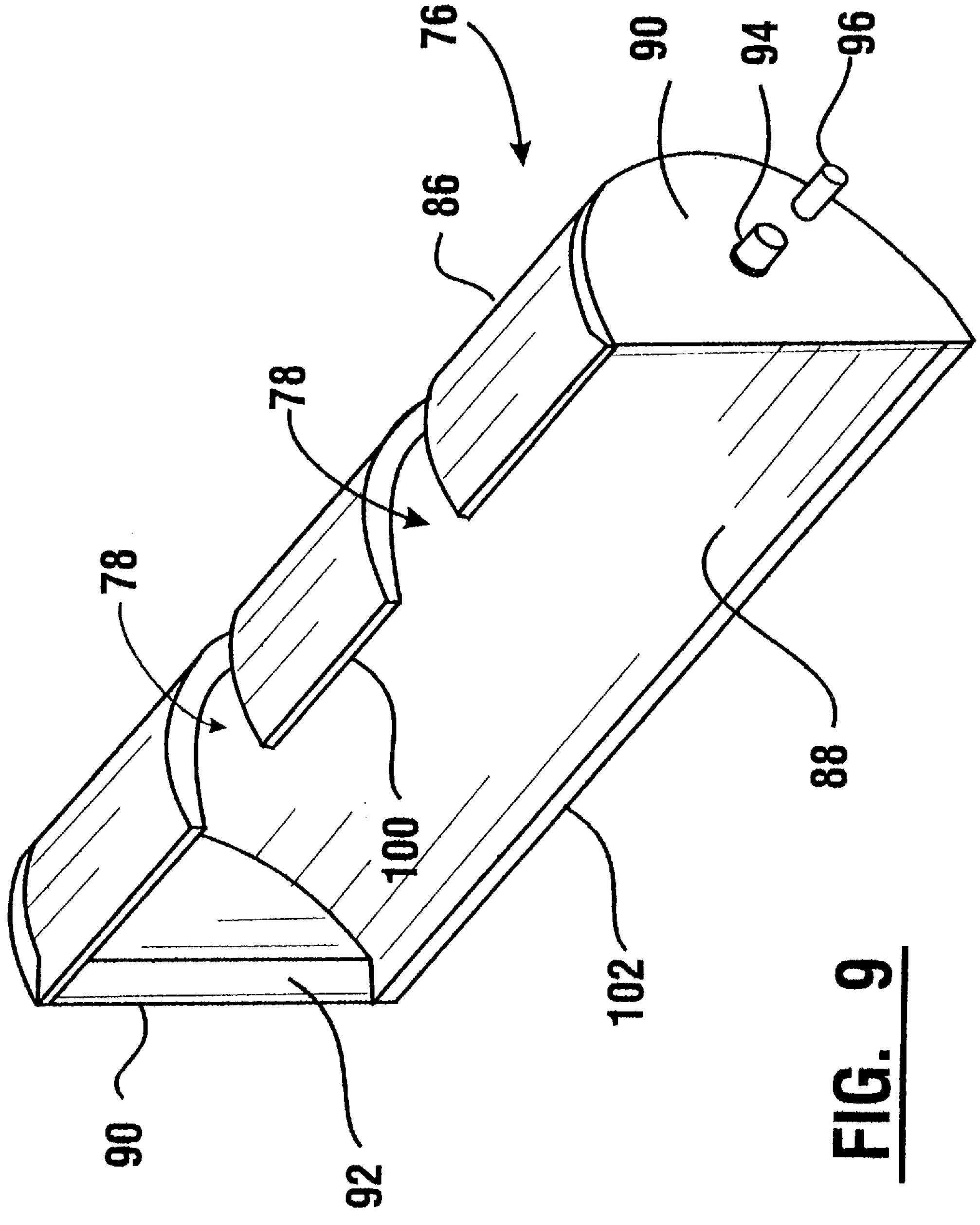
FIG. 9 is an isometric view of the gate of the apparatus of the invention.
Figure 10:
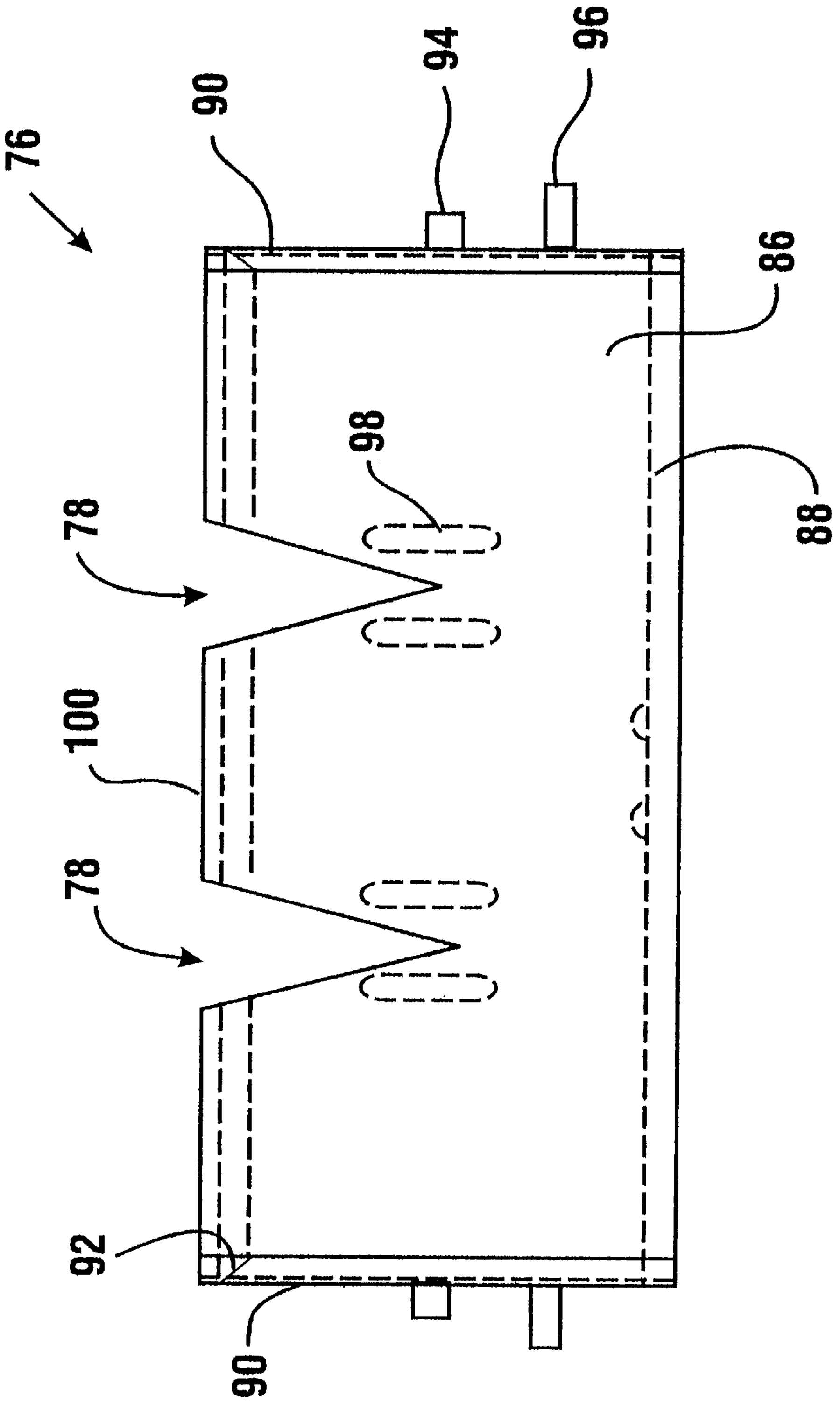
FIG. 10 is a top plan view of the gate shown in FIG. 9.
Figure 11:
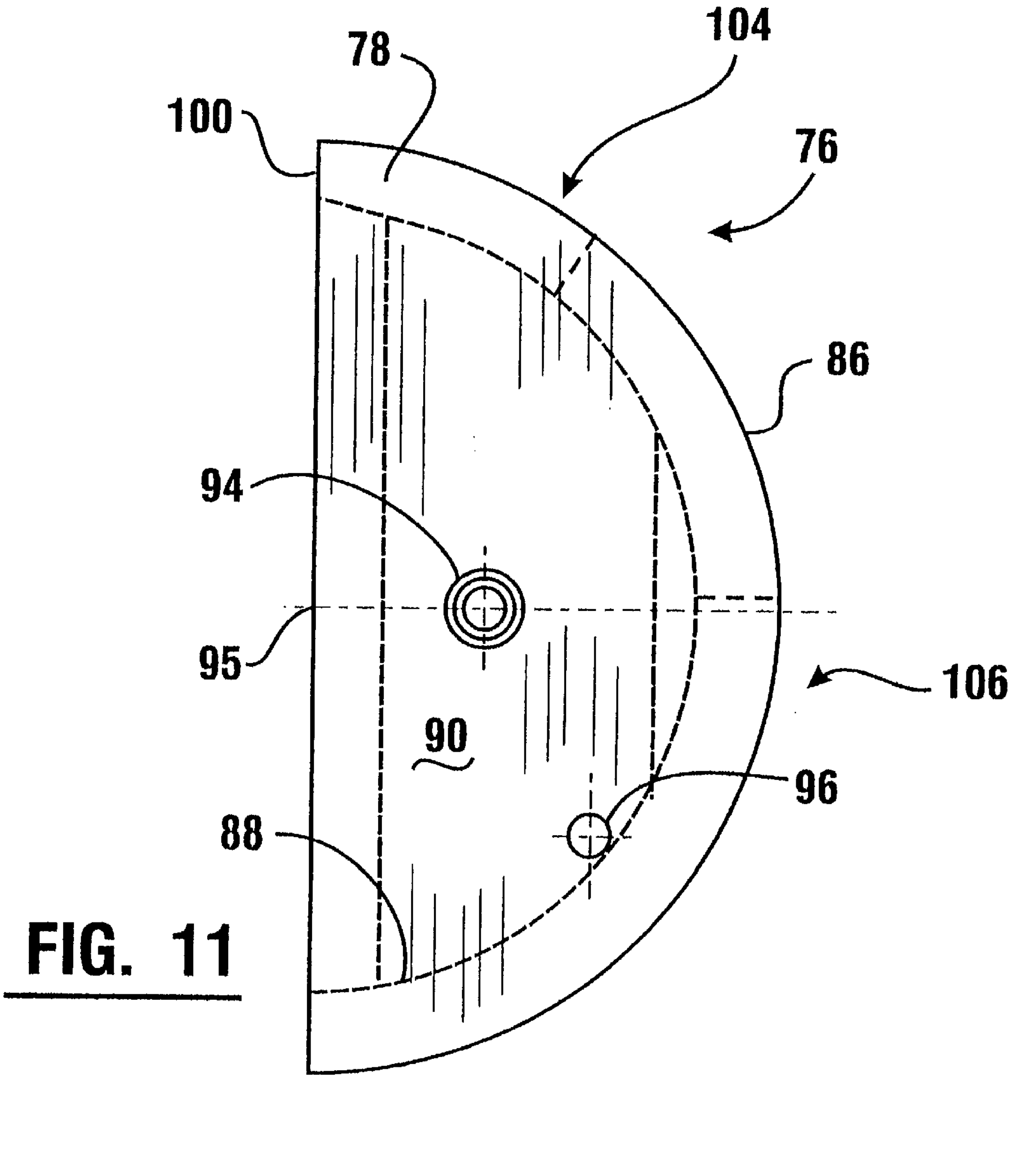
FIG. 11 is a right side view of the gate shown in FIG. 9.

Gate member 76 is shown in greater detail in FIGS. 9 through 11. Gate member 76 is arcuate in cross-sectional profile and includes an outside surface 86 and an inside surface 88. Gate 76 includes spaced end walls 90. End walls 90 have inwardly tapered portions 92.

End walls 90 further include a pair of outwardly directed shaft projections 94. Shaft projections are journaled in supported relation on frame 32 and comprise a pivot. It should be noted that shaft projections 94 are disposed off-center from a center of the arcs of the inside and outside surfaces. The center of the arcs is schematically indicated 95 in FIG. 11.

End walls 90 each further include outward extending stop projections 96. The purpose of stop projections 96 is later discussed in detail. Inside surface 88 further includes small inward extending projections 98 thereon. Inward extending projections 98 serve to break surface tension between sheets passing in supported relation with the inside surface in a manner later discussed. The inward extending projections 98 also keep the leading edges of sheets from catching on the bottoms of slots 78.

Gate member 76 further includes a top edge 100. Slots 78 extend transversely through the inside and outside surfaces of the gate member and terminate at top edge 100. Top edge 100 is somewhat tapered and thinned relative to the remainder of the arcuate profile of the gate member as shown in FIG. 11. Gate member 76 further includes a bottom edge 102. Inside surface 88 extends in an arc approximately 180 degrees between the top edge and the bottom edge. Slots 78 extend in a first portion generally indicated 104 of the outside surface of the gate member. The outside surface also has a second portion generally indicated 106 which is a smooth, arcuate surface and which provides low resistance to the movement of sheets thereon.

It should also be noted that because of the slots 78 and the absence of material therein, the gate member 76 is biased by gravity to rotate about shaft projections 94 in a clockwise direction from the position shown in FIG. 11. This weight distribution provides a biasing means which is operative to move the gate member in a manner later discussed.

The mechanical operation of the invention is now explained with reference to FIGS. 3 through 7. Printer 30 delivers a sheet 108 which in the preferred embodiment comprises a transaction receipt form. Printer 30 delivers the sheet 108 upwardly toward the lower belt flights of belts 50 and 52. Only belt 52 is shown in the Figures for purposes of simplicity.

Delivery of the sheet adjacent to the gate member is sensed by a first sensor 110. First sensor 110 is preferably a photoelectric optical type sensor. First sensor 110 is operatively connected to a controller 112 which is shown schematically in FIG. 5. The operation of the controller is later discussed in greater detail with reference to FIGS. 13 through 24. Upon the delivered sheet moving adjacent first sensor 110, controller 112 operates the drive by starting motor 38 to begin moving the lower belt flight in an outward direction generally indicated by Arrow A. The controller circuit is connected to a control device for the printer so that the drive begins moving responsive to operation of the printer having moved the paper an amount sufficient so that the paper sheet protrudes from the printer sufficiently to engage the belt flights. In other embodiments the drive may begin moving responsive to the sensor sensing the sheet moving adjacent thereto.

Sheet 108 is directed into a delivery area which includes a nip generally indicated 114 formed by the outside surface of the gate member and a downward facing first side of the lower belt flight. The delivery area is an area from which the form sheet delivered from the printer may be removed. The moving lower belt flight pulls sheet 108 into the nip and causes the sheet to engage the area on the outside surface of the gate member where the belt flight extends through the slot 78.

As shown schematically in FIG. 3, a stop serves to prevent rotation of gate member 76 in a clockwise direction. The stop operates by engagement of the stop projection 96 on the gate member with a surface of the frame. The stop assures that when the gate member is not being acted upon by a sheet moving in the outward direction, the gate member is maintained in the first position shown in FIG. 3.

Engagement of sheet 108 with gate member 76 and the lower belt flight of belt 52 causes the sheet to apply a force to the gate member. This force rotates the gate member in a counter-clockwise direction as shown, to a second position shown in FIG. 4. In this second position the sheet 108 is supported between the smooth second portion 106 of the outside surface of the gate member and the belt flight.

The gate member is preferably freely rotatably movable. Shaft projections 94 extend in journaled relation in frame 32. The force applied by sheet 108 moves the gate member to the second position without significant resistance. In the second position of the gate member, sheet 108 is enabled to readily pass in an outward direction over the outside surface of the gate.

It should also be noted that a gap 116 extends between the top edge 100 of the gate member and the roller 72. This gap is substantially closed as the gate member moves from the first position to the second position. This closure of gap 116 operates to insure that sheets passing over the gate member are directed to maintain engagement with the lower belt flight. The rotation of roller 72 is in a counter-clockwise direction as shown when the belt flight moves in an outward direction. As a result, any sheets which tend to maintain engagement with the outside surface of the gate member are directed against the moving surface of roller 72 and are directed back into engagement with the belt flight.

Figure 4:
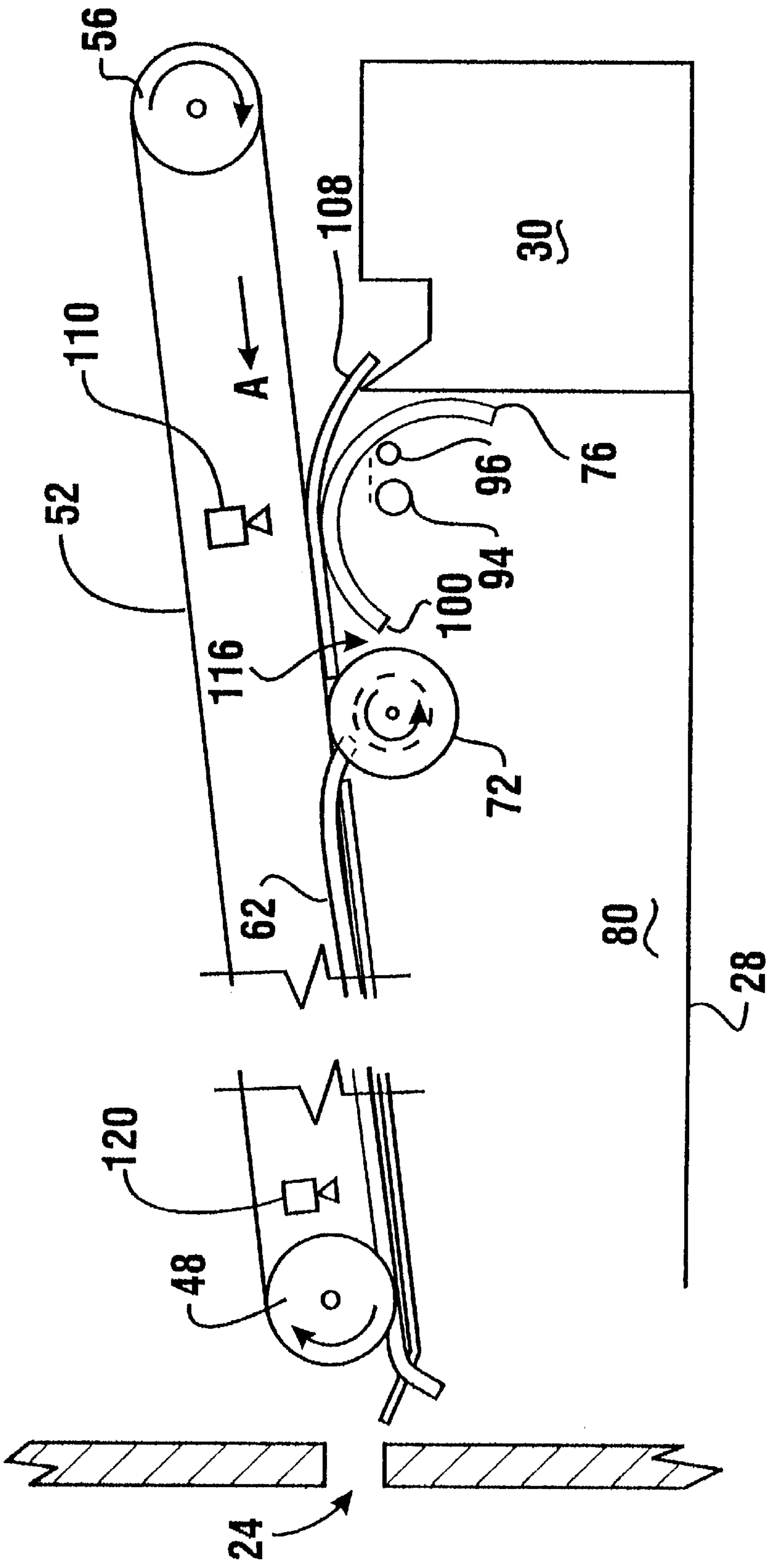
FIG. 4 is a view similar to FIG. 3 but with the gate member moved to a second position by engagement with a sheet.

It should be noted that the stop further limits movement of gate member 76 in the counter-clockwise direction. This is done by engaging the stop projection 96 with a further surface of the frame as indicated in FIG. 4. Thus the stop prevents the gate member from rotating too far in response to a force applied by the sheet.

Figure 5:
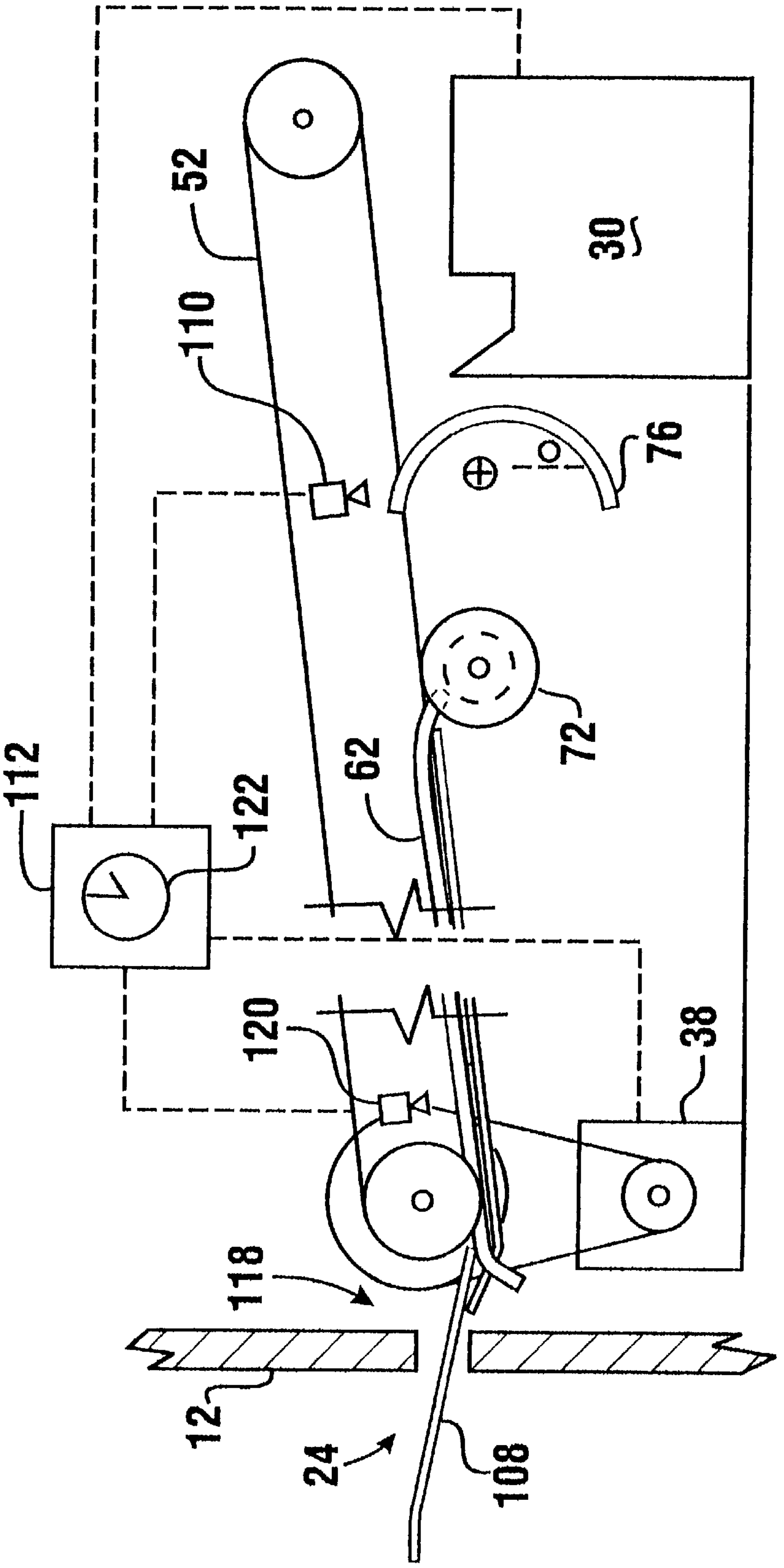
FIG. 5 is a view similar to FIG. 4 but with a sheet positioned at an outlet.

Sheets moving in the outward direction pass the gate member 76. Once the sheets are no longer engaged with the gate member, the gate member returns to the first position due to the biasing force of gravity as represented in FIG. 5. The sheets pass in the outward direction along a path which is preferably longer than a sheet length, until they reach an outlet generally indicated 118. At outlet 118 the sheet is accessible to the user. As shown in FIG. 5 sheet 108 extends outwardly at the outlet through the receipt delivery opening 24 in fascia 12.

The drive operates responsive to the controller to move the lower belt with the engaged sheet in the outward direction until a second photoelectric sensor 120 at the exit end of the path senses the passage of the inward end of the sheet. Sensor 120 is connected to controller 112 which operates to stop motor 38, which stops the drive moving the lower belt flight. The controller then runs the transport in reverse until it again senses the inward end of the sheet, and then stops transport movement. In this position the sheet 108 remains engaged to the belt flight and is directed slightly upward by the end projections 66 and 68, so as to facilitate its removal by the user through the opening 24. The belt flights allow limited slippage so the user may manually remove the extending sheet without damage.

Controller 112 is operatively connected with a timer schematically indicated 122. Controller 112 preferably includes one or more processors, and timer 112 is part of a programmed routine executed by a processor as later discussed. Alternatively, the timer may be resident in another system connected to the controller. In response to certain programmed conditions later discussed and after a set time, the controller operates a retract routine to move the drive in an opposed direction such that the lower belt flight moves in an inward direction as indicated by arrow B in FIG. 6. If the customer has not removed the sheet, the controller operates the drive so as to retrieve the sheet in a manner hereinafter described. If, however, the user has removed the sheet 108, the sheet will not be sensed and the controller executes programmed steps in response to this condition. Subsequently the apparatus is ready to deliver the next sheet.

Figure 6:
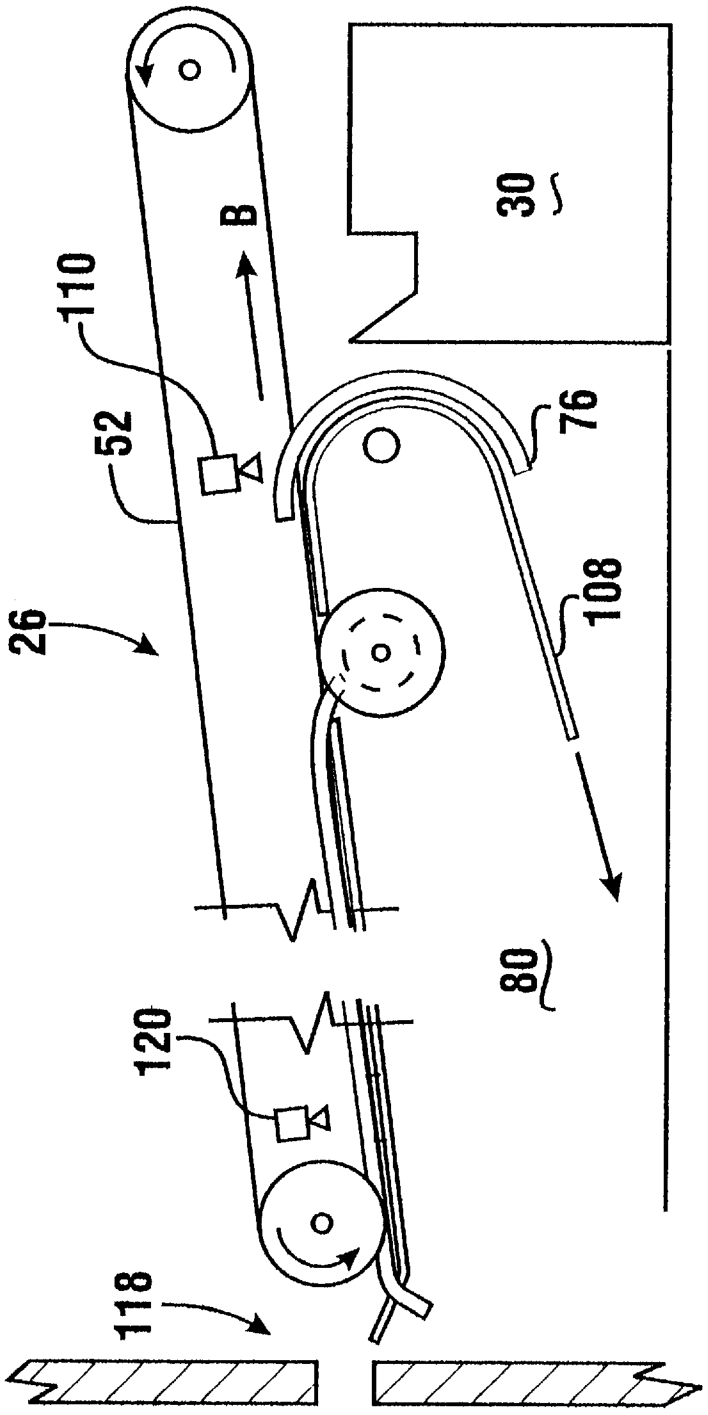
FIG. 6 is a view similar to FIG. 5 but with a sheet shown in the process of being retrieved.

If the user has not removed the sheet when timer 122 reaches the set time, the sheet continues to be sensed by second sensor 120. In response to programmed conditions being satisfied controller 112 operates the drive so that the lower belt flight moves in the inward direction. As a result sheet 108 moves in an inward direction along the path until it engages the arcuate inside surface of gate member 76. Upon engagement of the inside surface of the gate member, the sheet is directed in supported relation thereon into the storage location 80. As shown in FIG. 6 as the sheet 108 passes over the inside surface of the gate member it is turned 180 degrees. The sheet is also sensed by sensor 110 as it moves adjacent to the gate member 76.

Figure 7:
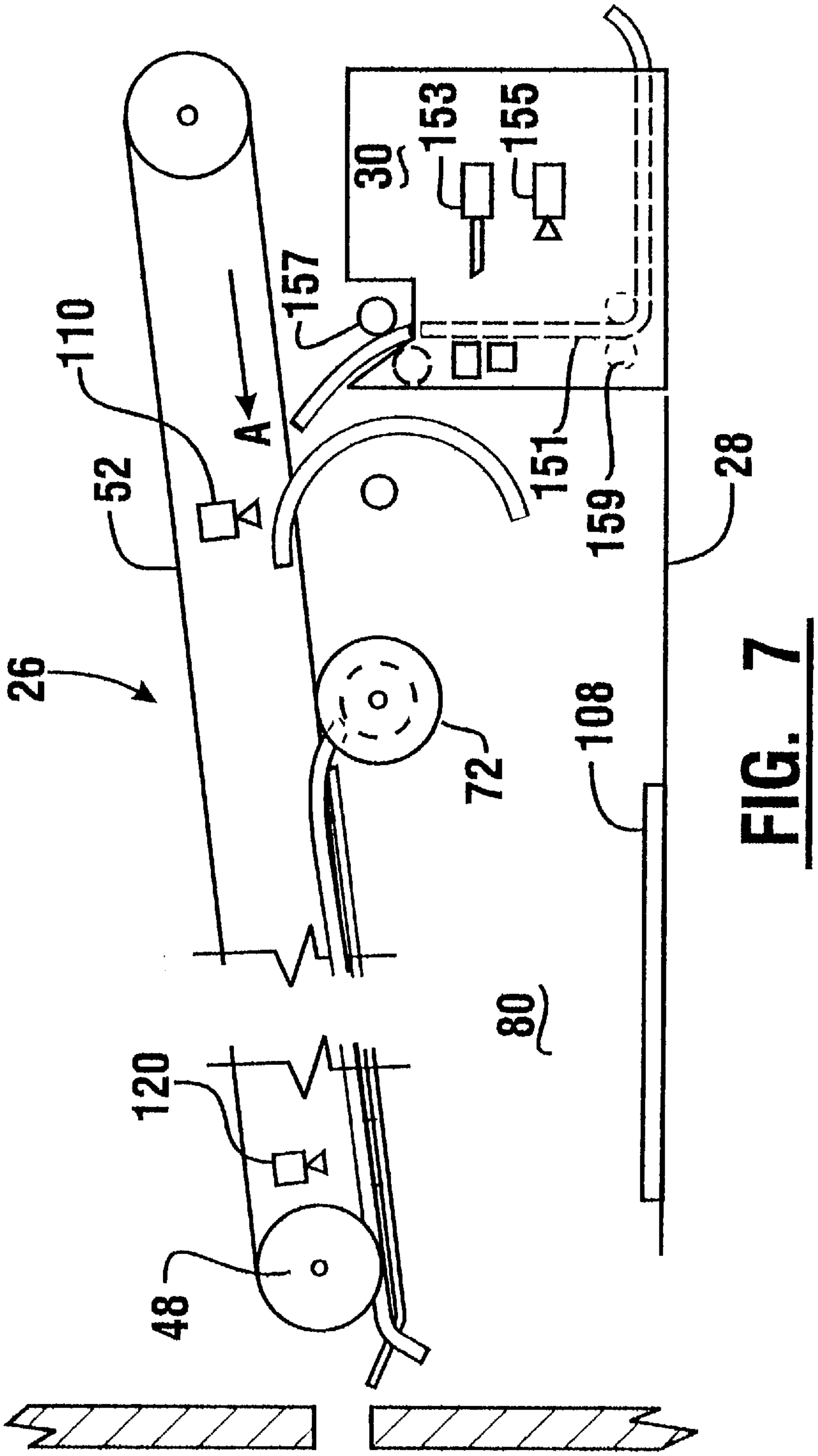
FIG. 7 is a view similar to FIG. 6 with the sheet retrieved and held in a storage location.

The controller 112 runs the drive with the lower belt flight moving in the inward direction for a sufficiently long time and in a manner to assure that the sheet is moved into the storage location. Upon the sheet reaching the storage location it preferably lies in a flat position supported on base 24. Because the retrieved sheet is delivered in a flat orientation, a large number of sheets may be stored in the storage location 80 before the retrieved sheets must be removed. As shown in FIG. 7 once the retrieved sheet has been delivered to the storage location, the transport and retrieval apparatus 26 is ready to deliver and retrieve further sheets from printer 30.

Figure 8:
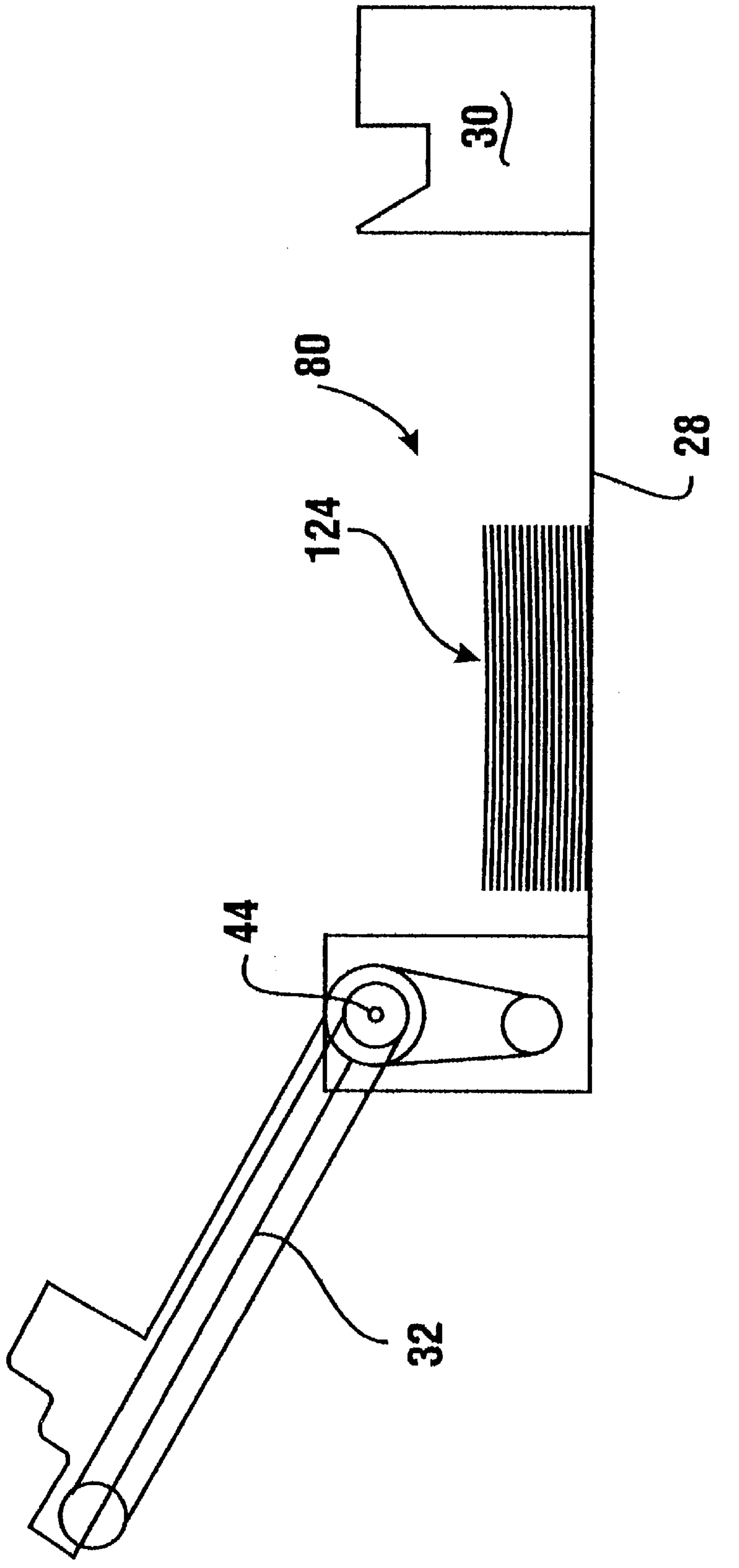
FIG. 8 is a schematic view of the apparatus shown in FIG. 2 moved to a service condition to access retrieved sheets in the storage location.

The removal of accumulated sheets is schematically demonstrated in FIG. 8. After a period of extended operation a stack 124 of retrieved sheets is housed in storage location 80. The controller is operative to detect when the storage location is full in a manner later discussed. The stack may be manually accessed and removed by rotating frame 32 about shaft 44 to the position shown in FIG. 8. This transversely disposes the frame and the belt flights supported thereon away from the storage location. In this position the stack 124 is more readily accessed for removal. Further, the printer 30 is also readily accessed for purposes of maintenance such as the changing of print cartridges or the replenishment of paper supplies or servicing. Once the stack 124 of retrieved sheets has been removed from the storage location, the frame 132 is returned to the operative position with the belt again extending between the sheet source which is printer 30, and the outlet.

The retrieved sheets of the embodiment shown lie in a generally horizontal orientation in the storage location 80. This is because the inside surface 88 of the gate member 76 extends generally about 180 degrees. However, in other embodiments of the invention the gate member can have different inside surface contours and angular configurations. For example, a 90 degrees arc may be used to align sheets vertically in a storage location. This may be desirable if storage location space is available only below the gate.

The system of the preferred embodiment is operated by controller 112 in a number of different ways in response to the occurrence of certain programmed conditions. For example, the controller operates to purge forms out of the receipt opening in response to the storage location 80 being full, or in response to the receipt being too long to retract. The controller also operates in ways which are operative to correct malfunctions such as paper jams.

In the preferred embodiment of the present invention the controller 112 preferably includes a microprocessor. The microprocessor is in operative connection with a memory. The memory is preferably a semi-conductor memory or firmware. However, in other embodiments other types of memories may be used. The controller which operates the receipt transport and retrieval system of the present invention may also operate the printer 30 and control the printing of the receipt forms. In other embodiments of the invention separate controllers for the printer and the receipt transport and retrieval system may be used.

Figure 13:
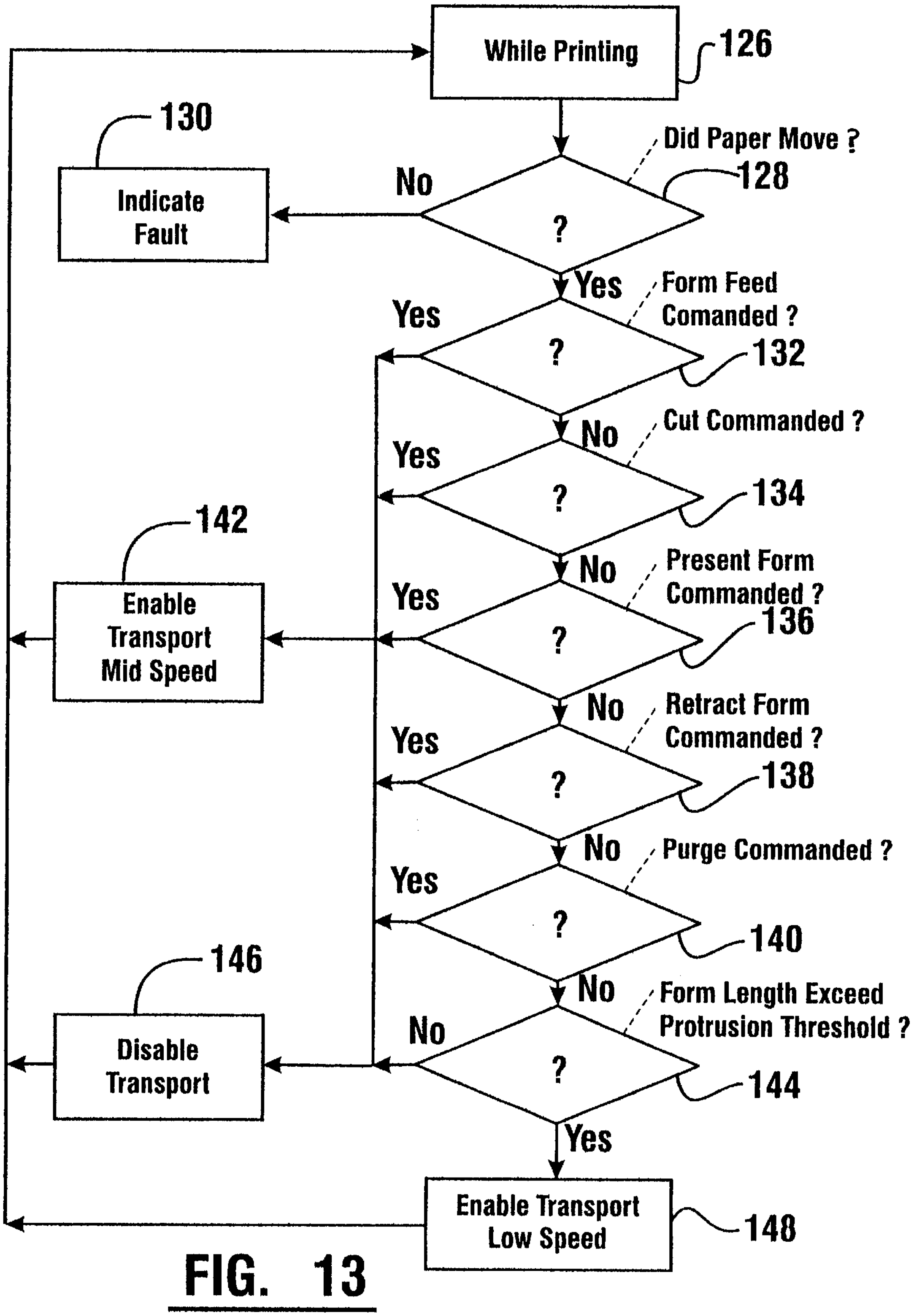
FIG. 13 is a schematic representation of steps executed by a controller of the preferred embodiment in a printing and transport control routine.
Figure 14:
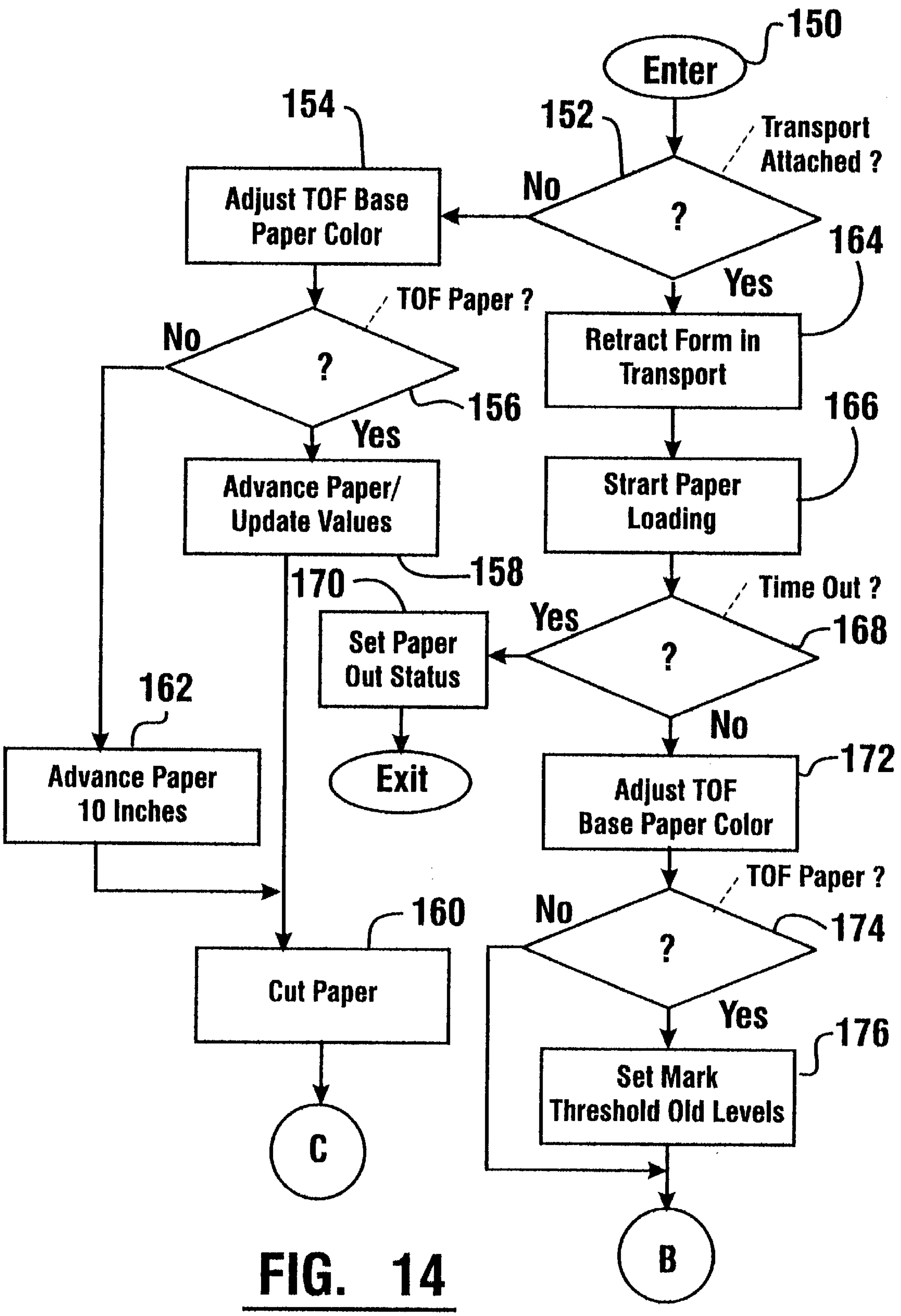
FIGS. 14 through 16 are a schematic representation of steps executed by the controller in a paper loading and grading routine.

Schematic representations of the steps executed by the controller 112 are graphically represented in, FIGS. 13 through 24. FIG. 13 is a schematic representation of the steps executed by the controller in a printing and transport control routine. The routine commences from a step 126 in which the printer is operating to print characters or other indicia on the paper. At a step 128 the determination is made by the controller 112 as to whether the paper on which printing is being conducted was sensed as having moved in response to the printer efforts to move the paper. Paper movement is preferably sensed using the system shown in co-pending U.S. application Ser. No. 08/568,887 filed Dec. 7, 1995 the disclosure of which is incorporated herein by reference. If it is sensed that the paper is not moving in response to the printer, a fault indication is given by the controller at a step 130.

If the controller senses that the paper is properly moving in response to the printer, the controller next determines at a step 132 if it has received a form feed command. If not, the controller next checks at a step 134 to determine if it has received a cut command which is indicative of an instruction to the printer to cut the paper. If no cut command has been received, a check is made at a step 136 to determine if a present form command has been received. If no command to present a form has been received, a determination is made at a step 138 if a command to retract the form has been received. Finally, a check is made at a step 140 to determine if a purge command has been received. If any of the commands represented in steps 132 through 140 have been received, the controller is operative at a step 142 to enable the transport to operate at medium speed. The transport is operated in accordance with the particular steps associated with the command that it has received which are hereinafter discussed. From step 142 the controller returns to step 126.

If none of the commands in step 132 through 140 have been received, a decision is made at a step 144 as to whether the length of paper that the printer has operated to print upon in the current form sufficiently protrudes from the printer to engage the belt flights of the transport. This is preferably done by the controller comparing a distance that the paper has been moved since the last cutting operation to a stored value. If the paper is not yet sufficiently long to engage the belt flights the transport is temporarily disabled at a step 146 and the program steps return to step 126. Once the paper has reached a sufficient length to engage the belt flights the controller executes a step 148. Step 148 is operative to begin moving the belts of the transport in a forward direction at a slow speed. In the forward direction the belt flights urge the sheet to move towards the receipt opening 24. As previously discussed, the configuration of the transport is such that the belts are enabled to overrun in engagement with the receipt form. From step 148 the belts continue to run at low speed until one of the other commands is received.

FIGS. 14 through 17 schematically demonstrate the steps executed by the controller as part of the paper loading and grading routine. The preferred form of the invention is operative to sense characteristics of the paper so that the controller may dynamically store and change stored threshold values to match the character of the paper in the sheets being used. The preferred form of the invention is dynamically adaptable to paper of varying quality and color. In the preferred form of the invention the controller is also preferably operable to store and update threshold values that are indicative of paper being sensed adjacent to a sensor as printing activities are conducted. In this way the preferred form of the system is enabled to operate properly with paper types that vary substantially. It also accommodates variations in the paper which occur in the middle of a roll or fanfold stack. The system also dynamically adjusts to the optical properties of "top of form" (TOF) marks when TOF type paper is used.

The paper loading and grading routine commences with an entry step 150 after which a check is made at a step 152 as to whether the transport for the receipts is in the operative position. If the transport has been moved to the position for servicing, such as for changing the paper supply, the controller will next execute a step 154. In step 154 the controller is operative to adjust a base paper color value to conform with that presented at a sensor 155 (see FIG. 7). Sensor 155 is preferably positioned within a paper path indicated 151 within the printer 30. The sensor 155 is positioned in the paper path at a location in advance of at least one paper drive mechanism schematically indicated by rolls 157, 159 which engage the paper and move it in the paper path. The sensor 155 is also preferably positioned in the paper path in advance of a paper cutter mechanism, schematically indicated 153. Cutter 153 is selectively operative to transversely cut the paper in the paper path. Sensor 155 is positioned sufficiently inward in the paper path so that when the end of the paper is sensed at the location by the sensor, the remaining paper can be moved outward by rolls 157 to engage the belts of the transport at the nip 114.

In the preferred form of the invention the sensor 155 is an optical type sensor that includes an emitter and a receiver. The controller is operative to adjust the intensity of the emitter so that the level of light reflected from the paper and sensed by the receiver in sensor 155 is increased to above a desired level. This assures that sensor 155 may reliably sense the paper adjacent thereto. In alternative embodiments however, a stored threshold level of the signal from the receiver may be appropriately adjusted to indicate the presence of paper, or both emitter and receiver threshold levels may be adjusted in response to characteristics of the paper. This is preferably accomplished based on reflectance from at least two spaced areas on a sheet, which are then used to set the threshold. For example, the readings from the two spaced locations may be averaged, and then an offset taken from the average for purposes of establishing the threshold level. The signals from sensor 155 may also be used to change emitter values or to adjust the paper sensing thresholds for signals from sensors 110 and 120.

At a step 156 a determination is made as to whether the paper which is being used is top of form ("TOF") paper. This may be done by an input from a service technician to the controller. However, in alternative embodiments it may be done automatically by the sensor 155 detecting variations in reflectance from the paper which are indicative of the presence of TOF marks. TOF marks are dark marks which are positioned on each sheet form. They are used to provide a reference for the printing and cutting of the form. Because TOF marks are uniformly positioned and are much darker (less reflective) than the surrounding surface of the form, the controller may be programmed to respond to the significant reflectance fluctuations associated with TOF marks and make the decision in step 156 based on the presence or absence of such fluctuations.

If TOF paper is indicated to be present in step 156, the controller next executes a step 158. In step 158 the printer is operative to advance the paper using rolls 157 and/or other drive mechanisms a sufficient distance to collect sample information concerning both the reflectance of the paper in the area of the TOF marks as well as in areas disposed from the marks. In the preferred form of the invention in step 158 the paper is advanced by the printer a distance of at least two TOF marks and threshold values corresponding to the presence of paper and the presence of a TOF mark on the paper adjacent to sensor 155 are updated and stored in memory. Thereafter the controller executes a cut form routine at a step 160 which is later described in detail, and proceeds to the steps that are later discussed in connection with FIG. 16.

If it is determined at step 156 that the paper that is being used is not TOF paper, the controller next executes a step 162. In step 162 the paper is advanced a sufficient distance to insure that the printer is enabled to move the paper reliably. In the preferred form of the invention the paper is moved forward about 10 inches. Thereafter the controller proceeds to step 160 and cuts the paper using cutter mechanism 153.

If at step 152 it is determined that the transport is in the operative position the computer next executes a step 164. Step 164 is a retract routine which is later discussed in connection with FIGS. 22 and 23. In the retract routine the controller is operative to move the belts of the transport to assure that any form therein is retracted and moved into the storage location 80. This step assures that before new paper is loaded the transport is clear.

The controller next executes a step 166. At step 166 the paper is moved forward in the paper path 151 by the drive mechanism in the printer. At a timing step 168 it is checked to see if an elapsed time has expired without the paper being sensed. If the paper has been attempted to be moved forward beyond the elapsed time without being sensed, the controller executes a step 170 in which the controller sets a status indicating that the printer is out of paper or is experiencing a similar fault. From step 170 the controller exits the routine.

If the paper is sensed within the elapsed time permitted in step 168, the controller moves on to a step 172. Step 172 is similar to step 154 previously discussed. In step 172 the controller is operative to evaluate the signals received from sensor 110 and to adjust the threshold intensity of the emitter associated with the sensor, or the threshold levels for signals from the sensor receiver to correspond with the reflectance characteristics of the paper which has been loaded. The controller then moves on to a step 174 which is similar to step 156 wherein a determination is made as to whether or not the paper that has been loaded is top of form paper. As with the previously discussed step this may be done based on an input or may be determined based on variations in paper reflectance.

If top of form paper is being used the controller executes a step 176 in which it sets threshold levels for detection of a TOF mark on the paper. These TOF mark threshold levels are set based on the general reflectance of the paper which is determined at step 172, if the decision as to the presence of TOF paper is based on a manual input. If the determination is made automatically, the mark threshold levels may be based on the reflectance characteristics of the TOF mark(s) sensed in the determination process.

Figure 15:
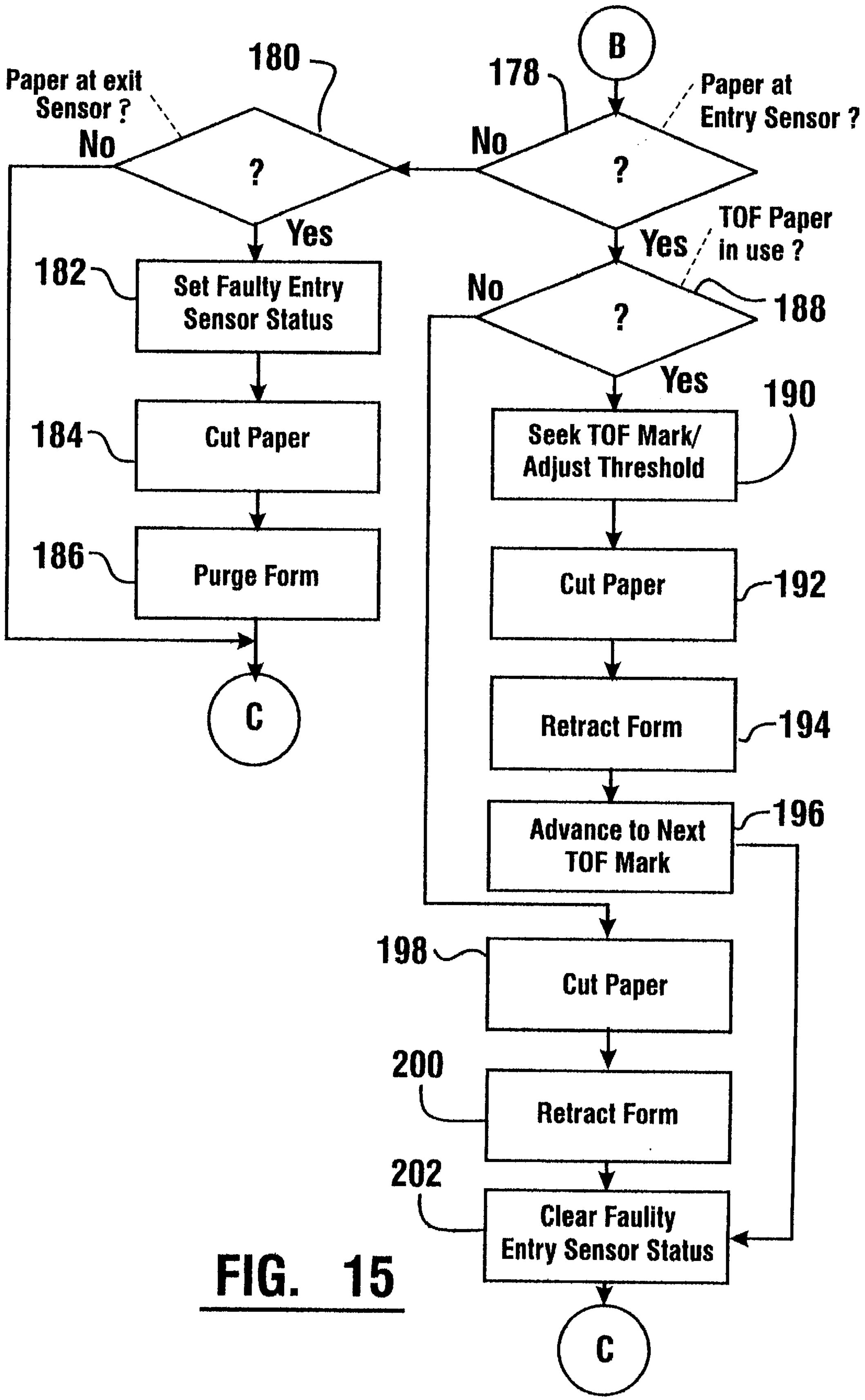

As shown in FIG. 15, the controller next executes a step 178 in which a determination is made whether the paper is adjacent to sensor 155. If paper is not sensed adjacent to the entry sensor a determination is made at a step 180 as to whether the paper is sensed adjacent to the exit sensor of the transport which is second sensor 120. If paper is sensed adjacent to the exit sensor but not sensor 155 then there is a problem and a faulty entry sensor status is set at a step 182.

After step 182 the controller is operative to execute a cut paper routine at a step 184 and execute a purge form routine at a step 186. These routines are later discussed in detail. Thereafter the controller proceeds to execute the steps shown in FIG. 16.

If at the decision step 178 paper is sensed adjacent to the sensor 155, the controller proceeds to a step 188. Step 188 is again a determination as to whether or not top of form paper is in use. This determination may be based on an input from a user, based on a determination from variations in reflectance values from the paper, or based on the decision that was made in step 174.

If it is determined that TOF paper is being used at step 188 the controller proceeds to a step 190. In step 190 the printer is operative to move the paper so as to place a TOF mark adjacent to sensor 155. The controller is thereafter operative to adjust the threshold representative of the presence of a TOF mark. This may be done by either adjusting the threshold intensity of an emitter associated with the sensor or adjusting the threshold signal values corresponding to the adjacent TOF mark.

After adjusting the thresholds associated with the adjacent TOF mark in step 190, the controller then executes the cut paper routine at a step 192. After cutting the paper the controller executes the retract routine at a step 194 and advances the paper to position the next TOF mark adjacent to sensor 155 at a step 156.

Alternatively, if in step 188 it is determined that top of form paper is not being used, the controller advances to a step 198 in which a cut paper routine is executed. At step 200 the form that has been cut is retracted back into the storage location. At either step 196 or step 200 the controller is operative to execute a step 202 which clears any residual status indication that the reading from the entry sensor is faulty.

Figure 16:
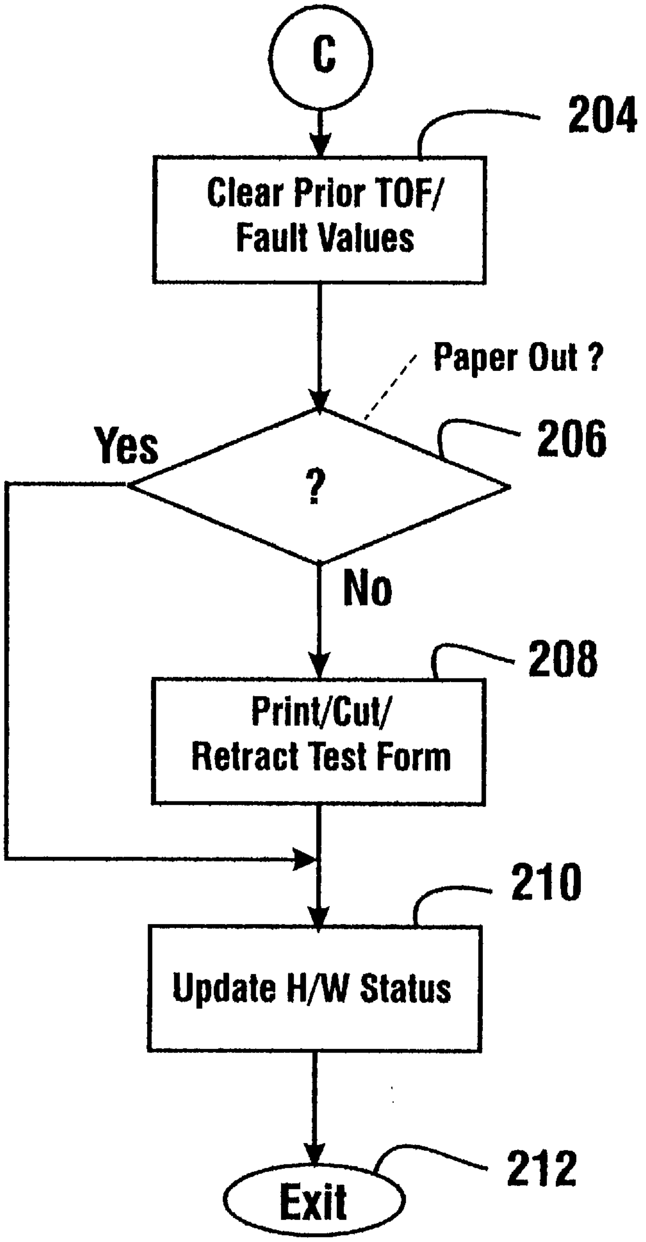

From either step 186, step 202 or step 160 the controller proceeds to step 204 shown in FIG. 16. In step 204 the prior values which the controller had been using for sensing TOF marks prior to execution of the current paper loading and grading routine are deleted. Similarly, prior fault values such as a fault value indicative of a paper out condition which existed prior to the current paper loading routine are cleared.

At a step 206 a determination is made as to whether in the course of the paper loading and grading routine currently being executed, a "paper out" condition was sensed. If not, the controller proceeds to a step 208. In step 208 the controller executes a preprogrammed routine in which it prints a test pattern on a single form, advances the form appropriately based on whether the form is a TOF form sheet or plain paper sheet and executes a cut routine and a retract routine to place the form in the storage location.

If the test routine at step 208 executes successfully, information indicative thereof is indicated in the program parameters of the controller at a step 210. Of course, if the apparatus has been determined to be out of paper at step 206, status information indicative thereof is updated at step 210. After the status information is updated the controller exits the program at a step 212.

During printing the printer responds to electrical signals from the controller which are indicative of the indicia to be printed on the form that is to be delivered. As indicated in FIG. 13, once the amount of printing which has been done on the form is sufficient to cause the form length to exceed a threshold, the controller executes a step 144 which enables the transport to begin moving at a step 148. As printing continues the form extends in the transport past the gate member, In the case of a plain paper form the form may be a variable length which is determined by the amount of printing thereon. In the case of a TOF form the form may be one or more connected TOF sheets extending in the transport.

Figure 18:
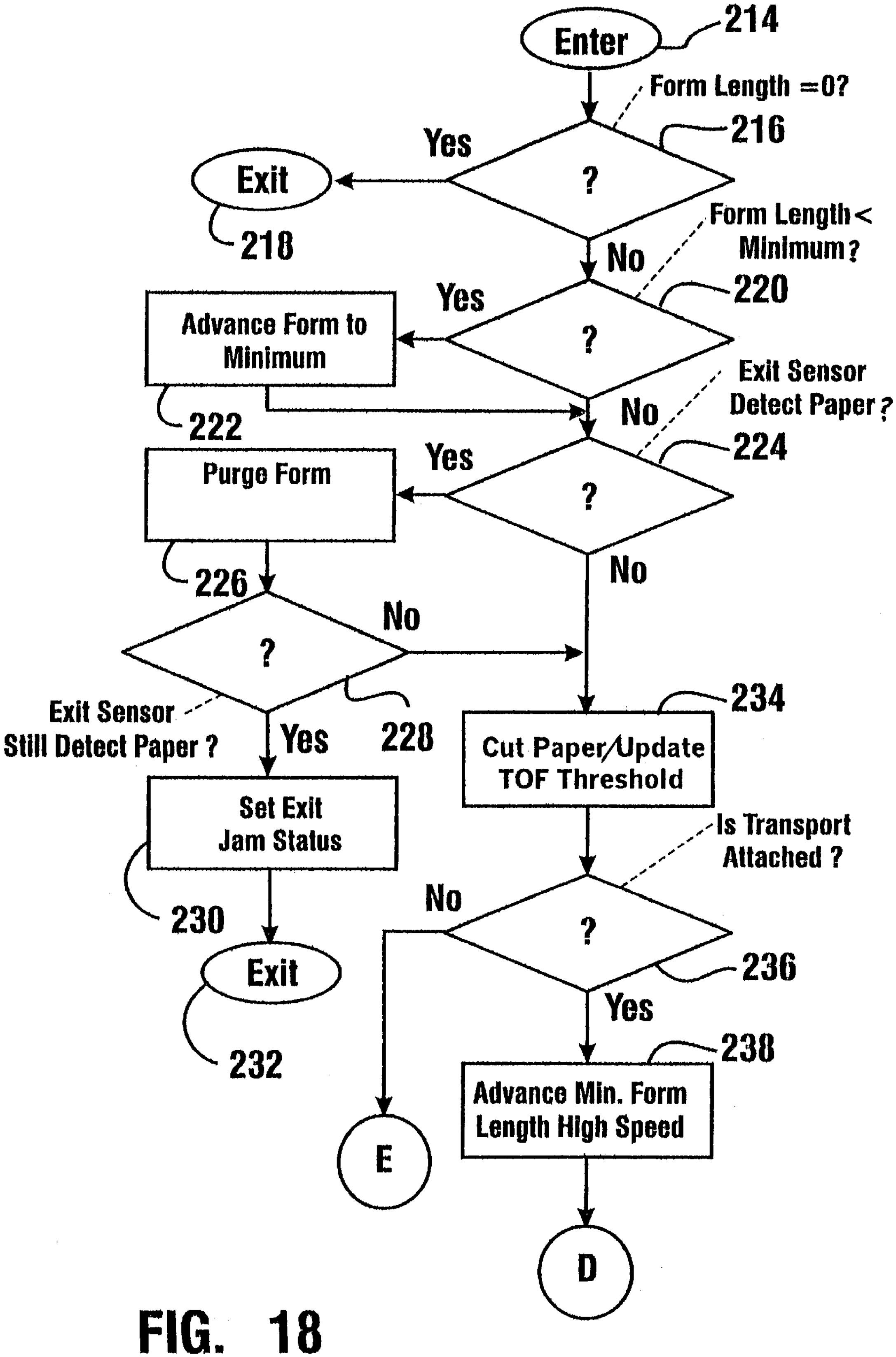
FIGS. 18 through 20 are a schematic representation of steps executed by the controller in a cut form routine.
Figure 19:
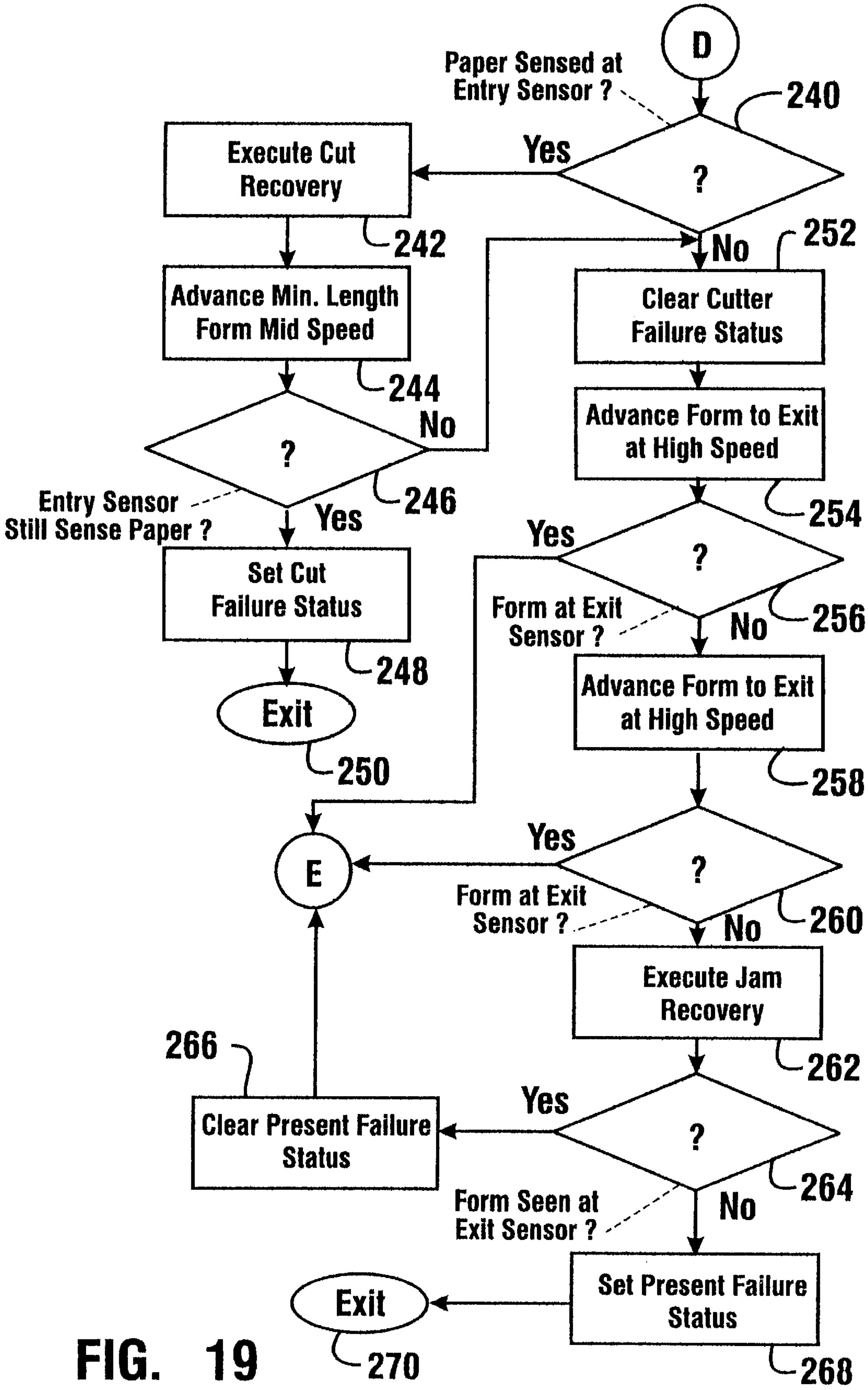
Figure 20:
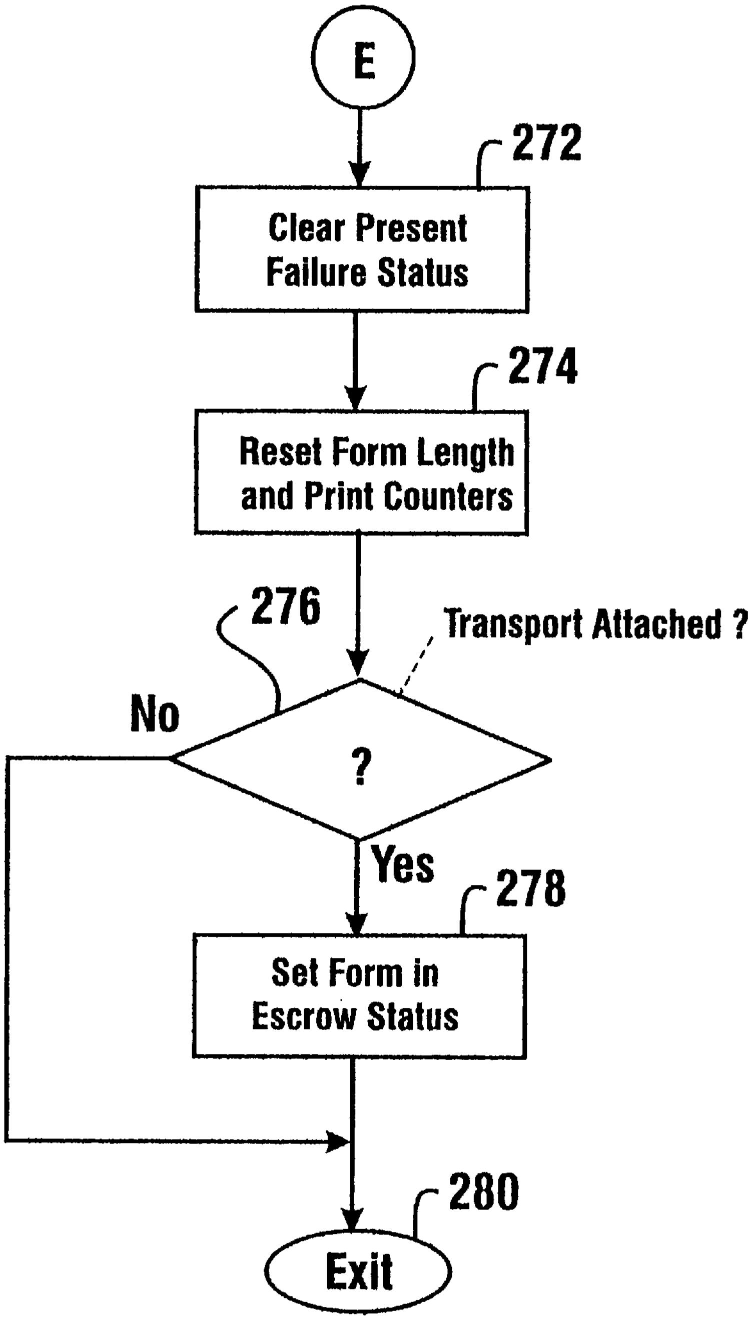

When the printing on the form is complete the controller is operative to execute the steps in the cut form routine represented in FIGS. 18 through 20. Thereafter the controller is operative to execute the steps in the present form routine shown in FIG. 21, which operates to present the form sheet to the customer.

The controller enters the cut form routine at a step 214. A determination is made at a step 216 if entry into the routine is erroneous because the form length based on the amount of printing is zero. If the form length is zero, the controller immediately exits the routine at a step 218. Assuming that the form length is not zero as determined at step 216, a determination is then made at a step 220 concerning whether the printed form length is above the minimum necessary for transport. Again this decision is based on the distance the printer has moved the form and conducted printing. If the decision made in the step 220 is that the form length is below the minimum, a step 222 is executed to advance the paper to the minimum form length.

From step 220 or step 222 the controller next executes a step 224 which involves making a determination of whether the transport is clear. If in step 224 the exit sensor 120 is sensing a form, a purge routine is executed at a step 226. The purge routine will generally remove the form at the exit and clear the transport. If however at a step 228 it is determined that the exit sensor is still not clear, a problem status is indicated at a step 230 and the controller exits the routine at a step 232.

If at step 224 no form is detected near the exit sensor or if the purge routine executed at step 226 is effective to clear the form, the controller executes a step 234. In step 234 the printer cuts the paper by actuating cutter mechanism 153. In addition, at step 234 the controller is also operative to update the top of form and paper reflectance threshold values stored in memory based on the reflectance characteristics of the particular form that has just been processed. This provides for updating the threshold values for each sheet and compensates for variations which occur among the sheets.

In step 234 the controller next proceeds to a step 236 at which a determination is made as to whether the transport is in the operative position. If so, the controller executes step 238 in which the transport moves forward so as to move a form of the minimum transportable length outward into the vicinity of the exit sensor 120. Alternatively, if the transport is found not be in operative position at step 236, the steps shown schematically in FIG. 20 are executed as later discussed.

From step 238 the controller executes a step 240. In step 240 a determination is made as to whether the paper is still being sensed adjacent to the entry sensor 110 in spite of the fact that the form should have been moved a distance sufficient to place it adjacent to the exit sensor. If the form is still adjacent to the entry sensor, a step 242 is executed in which the printer attempts to again cut the paper. From step 242 the transport again attempts to move the form towards the exit sensor in step 244. This time the advance of the form is attempted at middle speed.

The controller next executes a step 246. In step 246 a determination is again made as to whether the form is still adjacent to the entry sensor 110. If so, the controller executes a step 248 which indicates a failure status and exits the program at a step 250.

If however at step 240 or at step 246 the form is no longer sensed adjacent to the entry sensor, the controller executes a step 252 which clears any cutter failure status indication which may be in memory. The controller then operates the transport to advance the form towards the exit at high speed in step 254. In step 256 a determination is made as to whether the form is sensed adjacent the exit sensor 120. If so, the steps shown in FIG. 20 are executed.

If at step 256 the form is not sensed adjacent to the exit of the transport by sensor 120, a step 258 is executed. In step 258 the controller operates the transport so as to advance the form at high speed towards the exit. A determination is then made at a step 260 as to whether the form has reached the exit. If the form is now adjacent to the exit sensor the controller proceeds to the steps in FIG. 20. If however the form is not adjacent to the exit sensor the controller proceeds to a step 262.

In step 262 a jam-clear routine, sometimes referred to as a jam recovery routine, is executed. In the preferred form of the jam recovery routine the controller is operative to move the belts 42 and 52 of the transport in a back and forth motion, first in one direction and then the other. In the preferred form of the jam recovery routine the belts move in a first direction and then in an opposed direction from the initial starting point. This is done three times with the displacement of the belts in each direction increasing with each cycle. The back and forth movement of the belts in the jam recovery routine is generally operative to clear any jam and enable a stuck sheet to begin moving. The jam recovery routine is used in a number of situations by the preferred embodiment of the invention.

After executing the jam recovery routine the controller proceeds to a step 264 in which a determination is made as to whether the form was seen during the jam recovery routine adjacent to the exit sensor 120. If so, then the form has been freed and has likely been moved either out of the transport or into the storage location. In response to the form having been seen at the exit sensor, a step 266 is executed in which any failure status indications are cleared and the controller proceeds to the steps in FIG. 20.

If however the jam recovery routine in step 262 was not sufficient to cause the form to be sensed by the exit sensor, then the controller is operative at step 268 to indicate a present failure status and the controller exits the program at a step 270.

From either step 236, step 256, step 260 or step 266 the controller proceeds as shown in FIG. 20 to a step 272. In step 272 any present failure status indications are cleared. The controller then executes step 274 in which the form length and print counters are reset. This enables the controller to begin calculating a form length for the next form to be printed. At step 276 a check is made as to whether the transport remains attached, and if so the controller moves to a step 278 in which it indicates that a form for a customer is now in escrow in the transport. Of course, if the transport is no longer attached then it is not appropriate to indicate that there is a form in escrow. Thereafter the controller exits the routine at a step 280.

Figure 21:
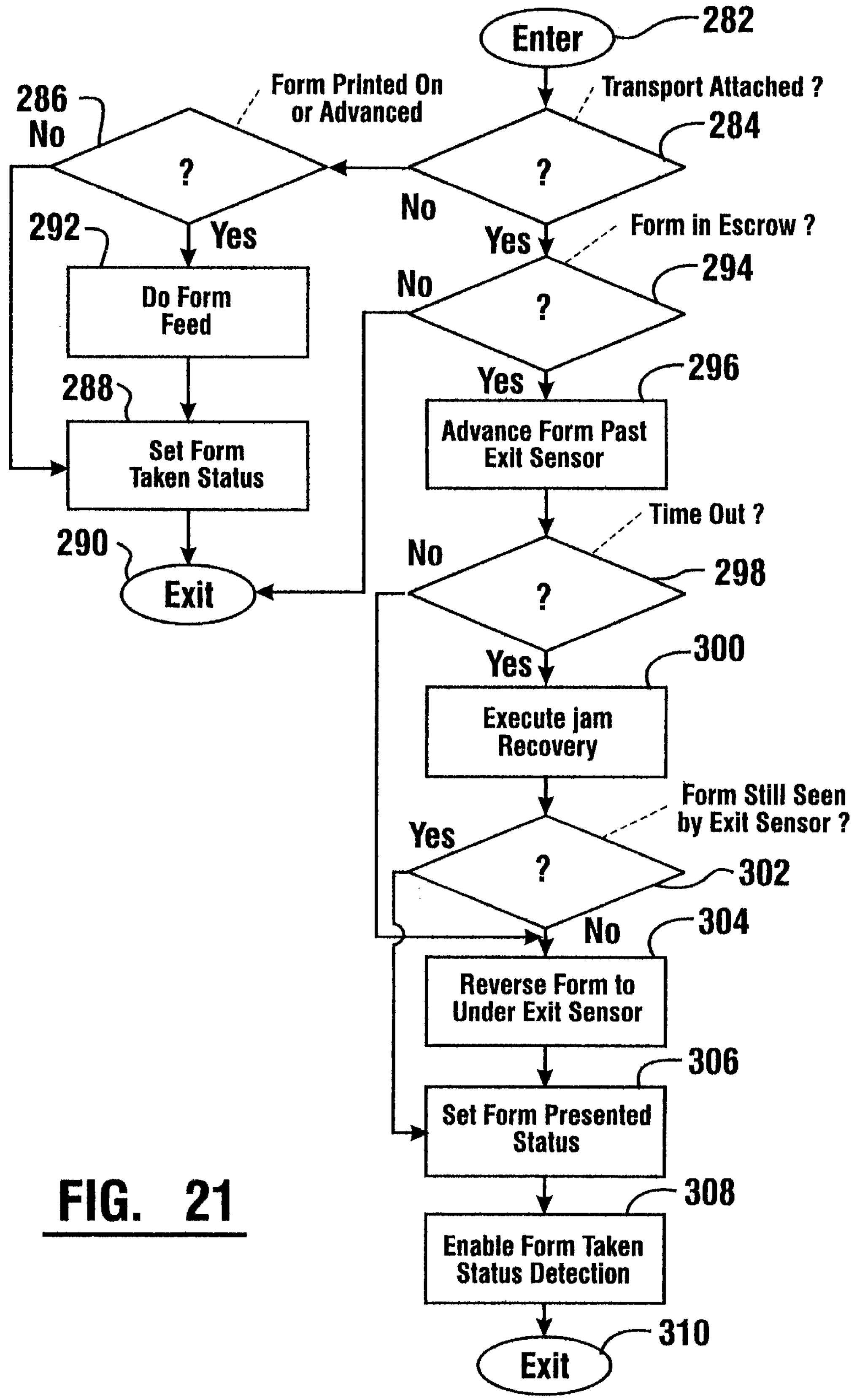
FIG. 21 is a schematic representation of steps executed by the controller in a present form routine.
Figure 22:
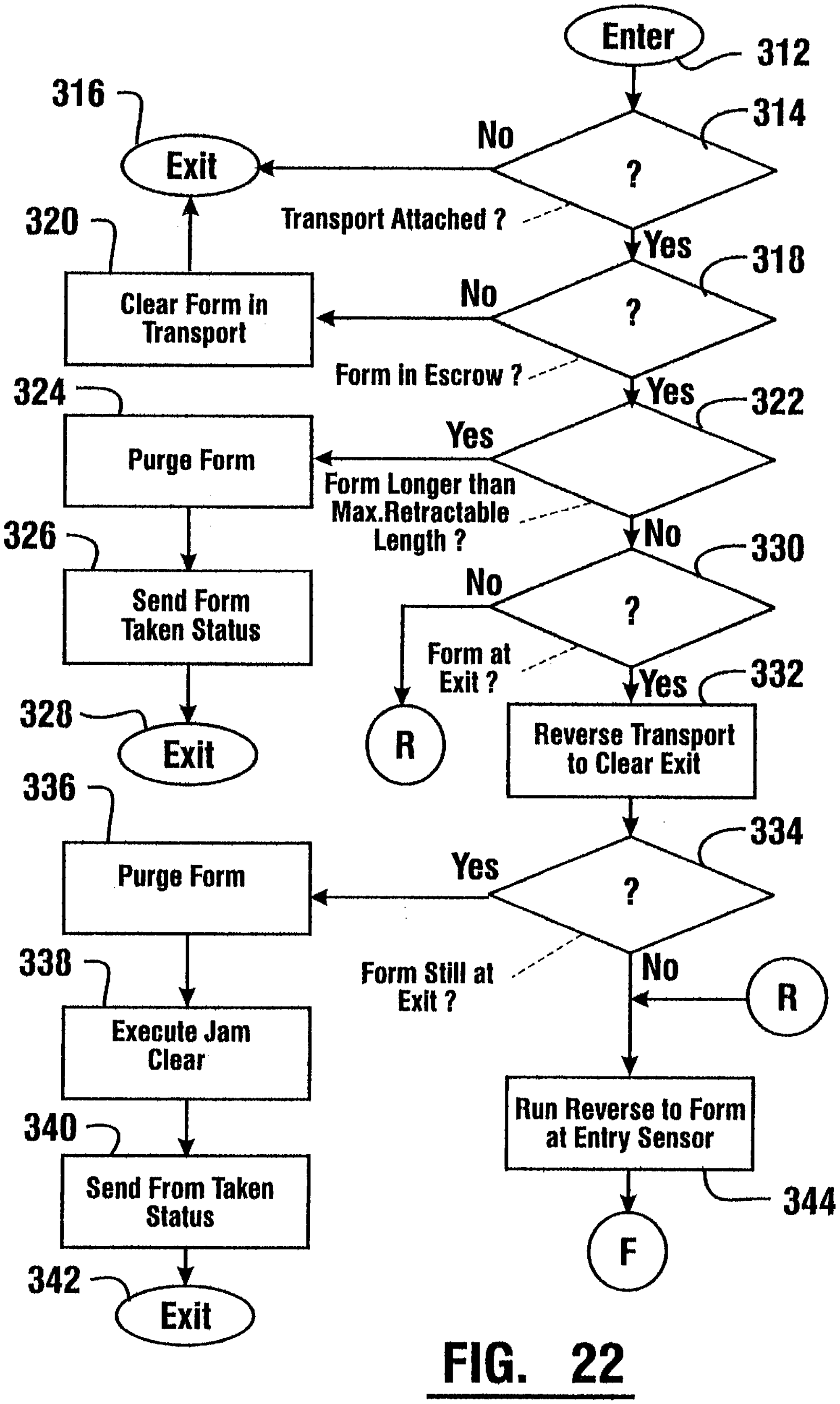
FIGS. 22 and 23 are a schematic representation of steps executed by the controller in a retract form routine.

Having placed the form in escrow in the transport the controller is operative to execute the present form routine schematically represented in FIG. 21. It should be understood that the presentation of printed forms is generally done one at a time. However, the preferred embodiment of the present invention enables the holding of more than one form in escrow in the transport if desired. This may be accomplished through appropriate programming which verifies a form as cut by moving it adjacent to the exit sensor 120 and then retracting it based on its length to an intermediate point in the transport pending the printing of additional forms.

When forms that are in escrow in the transport are to be presented, the controller executes the steps schematically indicated in FIG. 21. The controller begins by executing a step 282. From there a determination is made at a step 284 as to whether the transport is properly attached. If the transport is not attached a determination is made at a step 286 as to whether a form has been printed on or advanced. If not, the controller sets a form taken status at a step 288 and exits the program at a step 290. Likewise, if a form has been printed upon the controller executes a step 292 to feed the form. From step 292 the controller then proceeds through steps 288 and 290 to exit the program.

If in step 284 it is determined that the transport is attached the controller proceeds to a step 294. In step 294 a determination is made as to whether there is a status indicated in memory which represents that there is a form in escrow in the transport. If not, the controller exits the program. If however the proper status of a form being in escrow is indicated, the controller executes a step 296. In step 296 the controller operates the transport in an effort to move the form outward beyond the exit sensor 120.

While moving the form outward in step 296 an elapsed time is measured in a step 298. If the form is not sensed as having moved outward past the exit sensor within the elapsed time, then the jam recovery routine is executed at a step 300. The jam recovery routine is similar to that previously discussed in which the belts move cyclically back and forth in an effort to move the form.

After the jam recovery routine 300 a determination is made at a step 302 as to whether the form is still being seen adjacent the exit sensor. If the jam recovery routine was successful and the form is now not being seen by the exit sensor, or step 296 was successful in moving the form beyond the exit sensor, the transport is reversed by the controller at step 304 to place the form adjacent to the exit sensor for monitoring. The controller next executes a step 306 in which a status indication is given that the form is being presented. Step 306 is also executed in response to the form still being adjacent to the exit sensor at step 302.

After step 306 the controller is operative to execute a step 308. In step 308 the controller monitors whether the form has been taken by the customer. If the customer takes the form the form will be no longer detected by the exit sensor. Also during step 308 the controller is operative to execute a timing routine. As previously discussed, if the form is present at the exit sensor longer than a time set in the programming of the controller, the form will be retracted in accordance with the steps described in connection with FIGS. 22 and 23. When the form is presented in monitoring step 308 the controller exits the routine through a step 310.

If in step 308 the customer takes the form, then a form taken status is indicated and the transport is ready to proceed to present the next form to either the same customer or a different customer. If however the customer fails to take the form within the time specified the controller is operative to execute the steps represented by the retract routine graphically represented in FIGS. 22 and 23.

The controller enters the retract form routine beginning with a step 312. From step 312 a determination is made at a step 314 as to whether the transport is attached. If not, the controller exits the program at a step 316. If the transport is attached, the controller executes a step 318 in which a determination is made as to whether a status is indicated as the transport having a form in escrow. If at step 318 it is determined that the status indicative of a form being in escrow in the transport is no longer in memory, the controller operates to execute a step 320 in which the transport is run in reverse for sufficient time to retract any form that may be in the transport into the storage location, and then exits the routine.

If at step 318 the controller determines that there is a status indication that a form is in escrow in the transport, the controller moves to a step 322. In step 322 a determination is made concerning the length of the form that the printer has printed based on the line counters in the printer. The determination made in step 322 is whether the form is longer than the maximum length which can be retracted by the transport. It should be understood that in the preferred embodiment of the invention the printer is enabled to print forms which extend from the printer all the way through the transport to the customer. Therefore it is possible to have a form which is longer than can be retracted.

Figure 24:
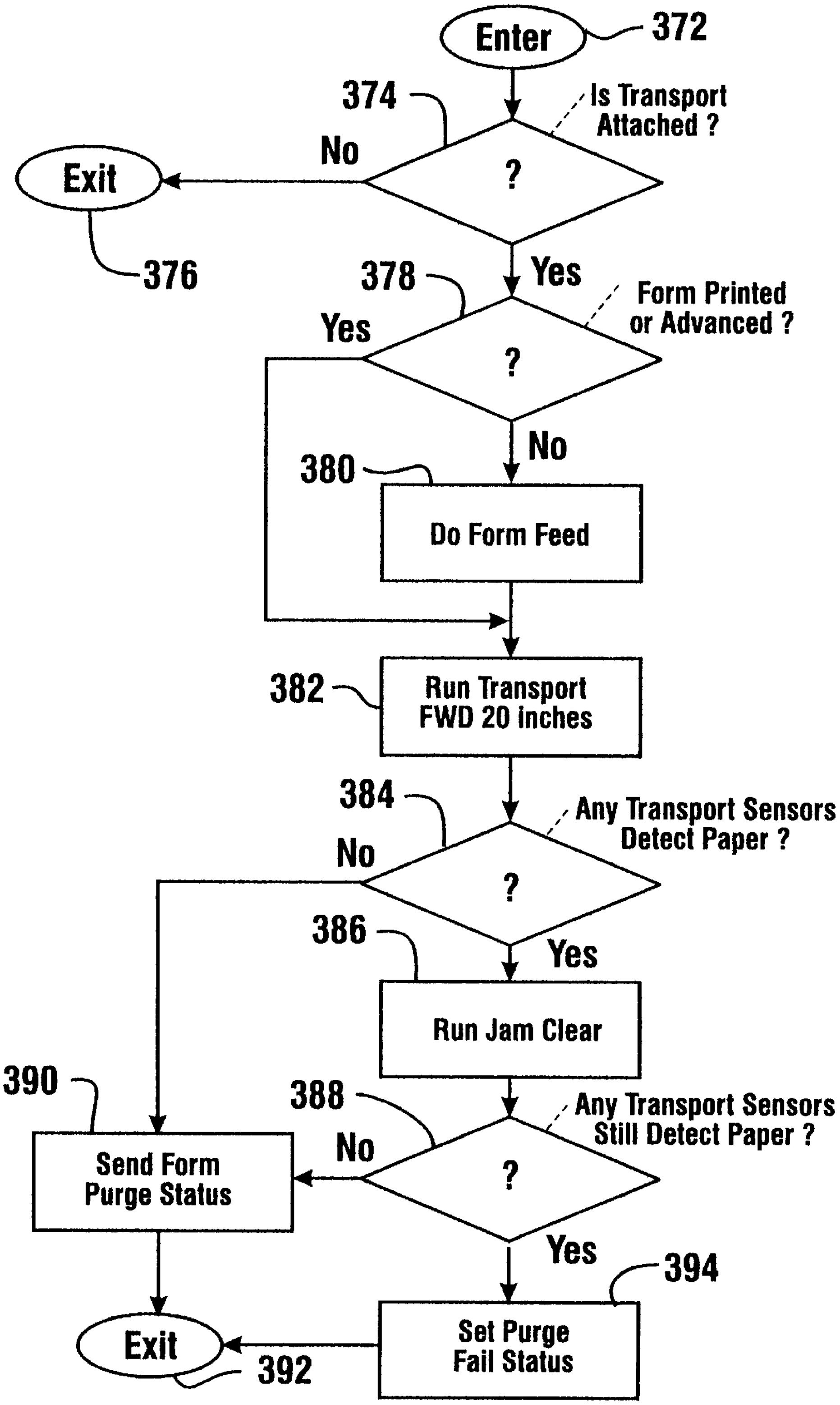
FIG. 24 is a schematic representation of steps executed by the controller in a purge form routine.

If at step 322 the form is determined to be longer than the maximum retractable length, a step 324 is executed by the controller. In step 324 the steps in the purge routine shown in FIG. 24 are carried out. After executing the purge routine the controller is operative to execute a step 326 in which the form status is indicated as taken, and the controller exits the routine at a step 328.

If in step 322 it is determined based on the length of form printed that the form in escrow is not too long to be retracted, the controller proceeds to a step 330. In step 330 a determination is made as to whether the form is currently adjacent to the exit sensor 120. If so, the controller executes a step 332 in which the transport is run in reverse to clear the exit sensor. After executing step 332, a step 334 is executed to determine if the form is still adjacent the exit. If so, the controller executes a purge form routine at a step 336. Thereafter the controller is operative to execute a jam recovery routine at a step 338. The controller then executes a step 340 to indicate that the form has been taken and exits the program at a step 342.

Figure 23:
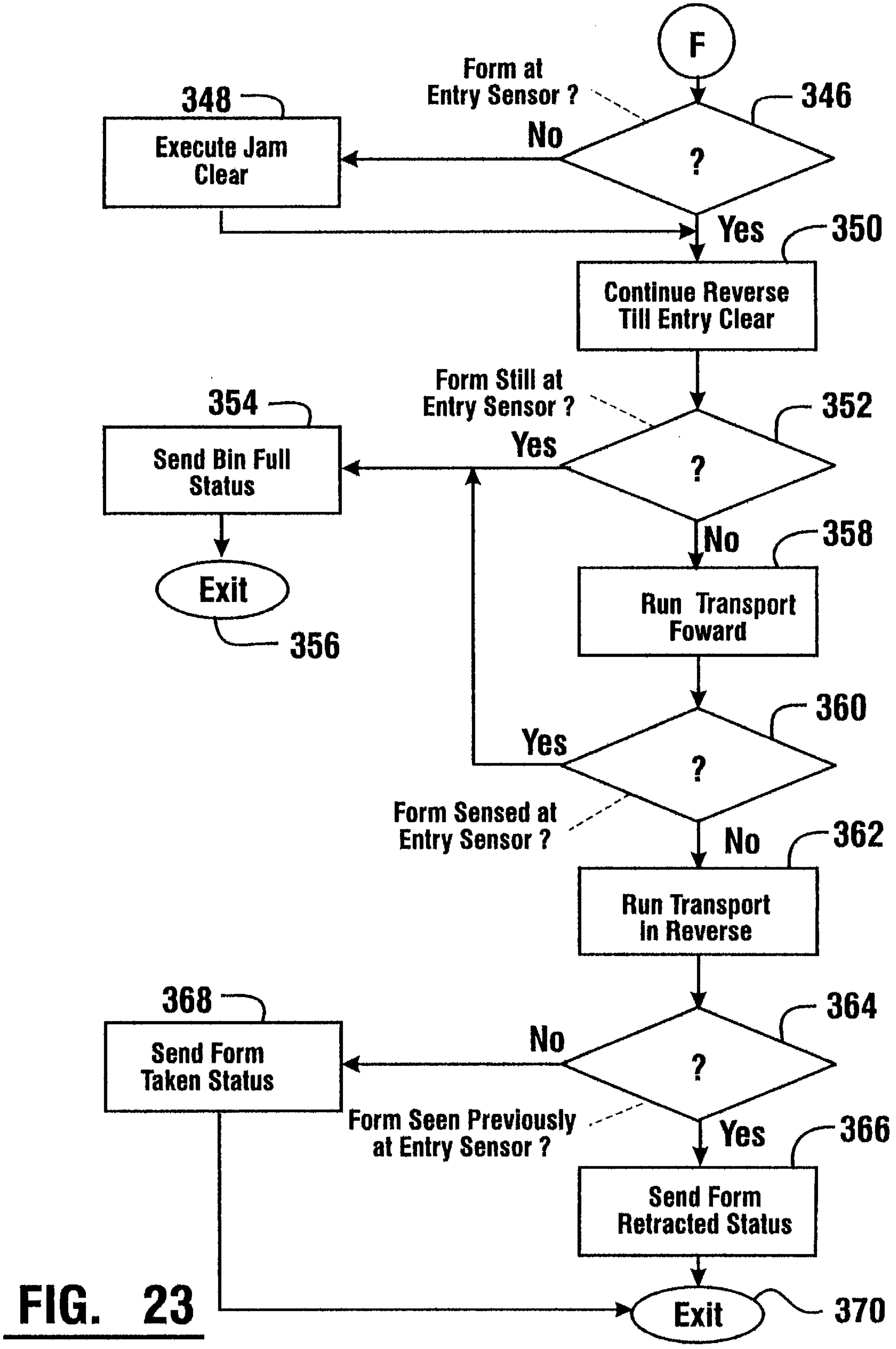

If at step 330 the form was found not to be adjacent to the exit sensor, the controller executes a step 344. In executing step 344 the controller is operative to run the transport in reverse until the form is sensed adjacent to the transport entry sensor 110. As shown in FIG. 23, a determination is made at a step 346 as to whether the form has moved adjacent to the entry sensor. If not, the controller is operative to operate a jam recovery routine at a step 348.

If the form is determined to be adjacent to the entry sensor at step 346 or after jam recovery routine 348, the controller is operative to execute a step 350. In step 350 the transport is continued to be run in a reverse direction until the entry sensor is clear. This indicates that the form has been retracted and directed by the gate member into the storage location 80. The controller next executes a step 352 in which a determination is made as to whether despite the operation of step 350 the form is still sensed adjacent to the entry sensor. If so, this is indicative that the storage location is full. An indication thereof is given by the controller through the execution of a step 354, and thereafter the controller exits the routine at a step 356.

If in step 352 the form is no longer sensed adjacent to the entry sensor this indicates that it has been likely properly retracted into the storage location. The controller next executes a step 358. In step 358 the controller is operative to run the transport forward a short distance and then stop. A step 360 is then executed in which a determination is made as to whether running the transport forward this short distance has pulled a form from the storage location which is sensed by the entry sensor. If so, this is indicative that the storage location is full and step 354 is executed.

If however in step 360 it is determined that the storage location is not full, a step 362 is executed. In step 362 the controller is operative to run the transport in reverse a distance similar to the distance that the transport was run forward in step 358.

The controller next executes a step 364. In step 364 a determination is made as to whether the form was seen by the entry sensor 110 during the course of conducting the retract routine. If so, a step 366 is executed in which a form retracted status is set by the controller. If however in step 364 it is determined that the form was not sensed by the entry sensor, then this is indicative that the customer took the form or that it was otherwise moved out of the transport. In response to this condition the controller is operative to execute a step 368 and to set a form taken status. From either steps 368 or 366 the controller exits the routine at a step 370.

The purge routine referred to in the discussion of the prior program steps is schematically represented in FIG. 24. The controller enters the routine through a step 372 and thereafter makes a determination in a step 374 as to whether the transport is attached to the printer. If the transport is not attached, the controller exits the routine in a step 376.

The controller next executes a step 378 in which a determination is made as to whether the printer has printed a form or a form has been advanced. If not, a form is advanced at a step 380. The controller is then operative at a step 382 to run the belts of the transport in a forward direction a distance sufficient to push any forms in the transport outward through the receipt opening 24. In the preferred form of the invention the distance that the belts are moved forward is about 20 inches.

After executing step 382 the controller next executes a step 384 in which a determination is made as to whether either of sensors 110 or 120 detect a form adjacent thereto. If so, a jam recovery routine is conducted at a step 386. The jam recovery routine is similar to that previously discussed in which the belts undergo an oscillating motion in an effort to clear a stuck form. After executing the jam recovery routine a determination is made at a step 388 as to whether a form is sensed adjacent to either of the sensors of the transport. If not, or alternatively if the transport sensors were clear at step 384, the controller is operative at a step 390 to set a form purged status indicative that the form has been pushed out of the receipt opening and that the transport is clear. The controller is thereafter operative to exit the program at a step 392. If however at step 388 it is determined that a form is still sensed adjacent to one of the transport sensors, then the controller is operative at a step 394 to set a purge fail status. The controller then exits the routine.

A further novel feature of the preferred embodiment of the present invention is that it avoids cutting of the paper when approaching the end of the paper supply. This is particularly helpful when a continuous roll of paper is used as the supply and the cutting of the paper after printing the "last" form will leave a short scrap of paper which cannot be handled by the printer or transport. Such a scrap piece of paper may jam the printer when new paper is fed.

Figure 17:
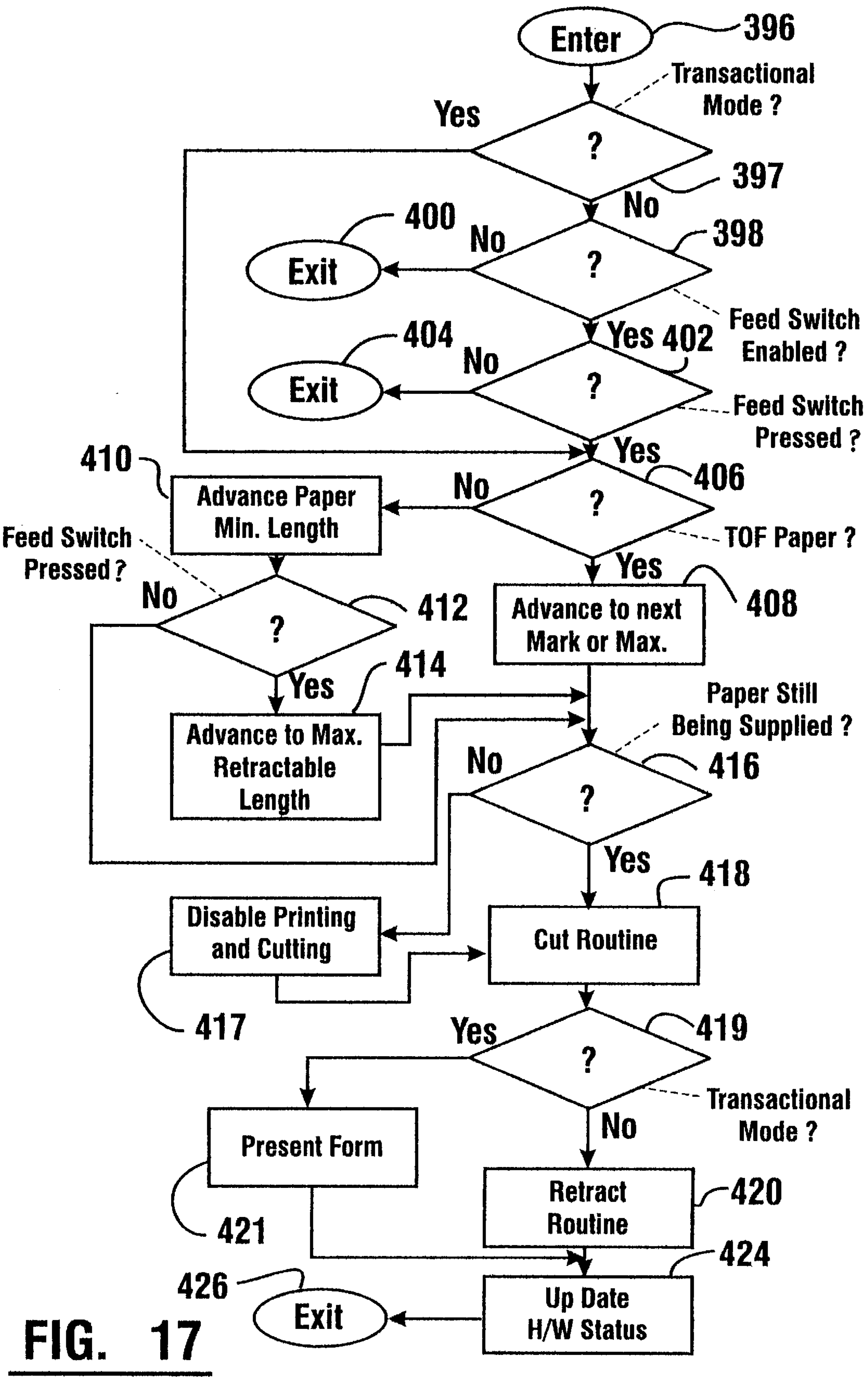
FIG. 17 is a schematic representation of steps executed by the controller in a paper form length control routine.

A form length control routine which is executed by the controller is schematically represented by the steps shown in FIG. 17. The form length control is operative in the processing of each form. This routine is critically involved when little paper is left and it is desired to install a new roll or supply. Alteratively, the routine may be used to test paper movement.

From an entry step 396 the controller proceeds to determine if the system is in a transactional mode or a service mode at a step 397. The setting of this mode is based on inputs or other conditions sensed by the controller. If the system is in service mode, the controller proceeds to determine if a feed switch is enabled at a step 398. The feed switch is a manual type switch that is enabled by the controller. For example, the controller may disable the feed switch in response to certain status conditions. If the feed switch is determined not to be enabled in step 398 the controller exits the routine at a step 400.

From step 400 the controller next executes a step 402 to determine if the feed switch has been manually pressed. This is done when test feeding paper or when unloading paper from an almost depleted supply so a new supply may be installed. If the switch has not been pressed the controller exits the routine at a step 404. If the feed switch was pressed the controller moves on to a step 406.

In step 406, which is reached from either step 397 or step 402, a determination is made as to whether the paper being used is TOF paper. As previously discussed, this can be based on an input by a user indicative that TOF paper is being used. Alternatively, this may be derived by moving the paper past the sensor 155 and sensing the periodic variations in reflectance associated with the presence of TOF marks.

If TOF paper is indicated at step 406 the paper is advanced at a step 408 to the next TOF mark or until the amount the paper advanced corresponds to a programmed maximum form length. However, if TOF paper is not indicated in step 406, the non-TOF paper is advanced in a step 410 an amount which corresponds to the minimum form length suitable for handling by the transport.

At a step 412 a determination is made whether the feed switch is being manually held. This is indicative that a servicer desires to unload the remaining paper. If the switch is being held the printer and transport advance the paper to the maximum paper length that can be retracted at a step 414.

From steps 408, 412 or 414 the controller proceeds to a step 416 wherein a determination is made as to whether paper is still being supplied. This determination is preferably made based on sensor 155 no longer sensing paper. Alternatively, the end of the paper may be sensed using the apparatus disclosed in U.S. patent application Ser. No. 08/568,887 the disclosure of which is incorporated herein by reference. If paper is no longer being supplied, the cutting action of the cutter mechanism 153 associated with the printer 30 is disabled at a step 417.

From step 416 or 417 the controller proceeds to execute the cut routine in step 418. Of course if step 417 was executed the paper is not actually cut during the cut routine. As a result all the paper remaining in the supply is moved through the printer and into the transport. In other cases the length of form pulled into the transport in step 418 will be the minimum form length or the maximum retractable form length.

From step 418 the controller determines if it is in transactional mode or service mode at a step 419. If the machine is in service mode the controller executes a retract routine at a step 420. The retract routine is operative to retract the form into the storage location. If at step 419 the controller is in the transactional mode, the controller executes a present form routine at a step 421. The execution of this routine will generally result in delivery of the form to a customer. At a next step 422 the controller operates to update its internal status record. If for example, the paper is now out, a status indicative thereof is set. Likewise if a form was cut as a test, the status set indicates that the paper is loaded and the transport is ready. The controller then exits the routine at a step 426.

It should be understood that in the preferred form of the invention the paper cutting and printing activities are suspended whenever the paper is sensed as depleted. When paper is sensed as depleted, using sensor 155 in the printer or the system described in the incorporated patent disclosure, the remaining paper is sufficiently long to be moved by the printer transport mechanism through rolls 157, into engagement with the belts of the transport. The transport carries the last portion of the paper away from the printer. As a consequence, small pieces of paper which cannot be handled by the printer or transport are not produced at the end of a paper supply. This avoids problems associated with small pieces of paper that could jam the printer or cause it to malfunction.

In the embodiment shown the sensor 155 is enabled to provide a signal to the controller which indicates that it should cease further operation of the cutter. In this embodiment this result is achieved because the location in the paper path at which sensor 155 senses the paper is disposed a first distance in the paper path from the final drive rolls 157 which engage and move paper through the printer. This first distance is greater than a second distance that the paper must extend beyond the drive rolls 157 in the paper path to reach the delivery area from which the form sheets may be taken. In the preferred embodiment, the delivery area includes the nip 114 from which the transport may take the sheets. Of course, in other embodiments the delivery area may be an entrance to a different type of transport or an area in which a sheet may be manually engaged by a customer.

In the preferred embodiment the cutter mechanism 153 is disposed in the paper path upstream from the rolls 157, so the rolls may solidly move the cut sheets to the delivery area. However, in alternative embodiments the cutter may be positioned on the downstream side of the final drive rolls 157. Likewise, in the preferred embodiment the place where indicia are printed on the paper by the printer mechanism is positioned upstream in the paper path from both the cutter and the final drive rolls. However, different arrangements may be used in other embodiments. Likewise while sensor 155 is used to sense the presence of paper at a single location in the paper path, and the controller discontinues cutting operations as soon as the sensor no longer senses the paper, other embodiments may use other types of sensors and may delay the cessation of cutting activities until the paper has moved a further distance beyond the condition where the end of the paper supply is sensed. This will depend on the system configuration, the ability to calculate the distance the paper moves and the amount of paper remaining when the end of the paper is sensed. Those skilled in the art will devise other embodiments of the invention which employ the fundamental aspects of avoiding production of a form sheet which is too short to extend from the drive to the delivery area based on the disclosure herein.

It will be appreciated by those skilled in the art that variations of the above-described steps may be executed in efforts to clear jams and purge the transport. It will be further understood that although the controller 112 is described as adjusting threshold levels for detection of paper at the entry sensor 155, corresponding threshold levels for detecting paper at the transport sensors 110 and 120 may similarly be adjusted. This may be done either through the process of sensing successive areas on a sheet with sensor 110 or 120 in a manner similar to that described with reference to sensor 155, or by adjusting threshold levels for one or both sensors 110 and 120 in accordance with the paper characteristics as determined using sensor 155.

The preferred form of the present invention provides a simple yet highly reliable transport and retrieval apparatus for receipts and other sheets delivered by an automated banking machine. The invention is also highly compact because of the gate member and the ability of the apparatus to store numerous retrieved sheets in a stacked relation in a confined area. It also enables ready removal of the retrieved sheets as well as superior access for servicing the components thereof. It is also self-adapting to various form and paper types.

Thus the new sheet transport and retrieval system of the present invention achieves the above-stated objectives, eliminates difficulties encountered in the use of prior devices and systems, solves problems and attains the desirable results described herein.

In the foregoing description certain terms have been used for brevity, clarity and understanding. However, no unnecessary limitations are to be implied therefrom because such terms are for descriptive purposes and are intended to be broadly construed. Moreover, the descriptions and illustrations herein are by way of examples and the invention in not limited to the details shown or described.

In the following claims any feature described as a means for performing a function shall be construed as encompassing any means capable of performing the recited function, and shall not be deemed limited to the means shown or described herein for performing the recited function or mere equivalents thereof.

Having described the features, discoveries and principles of the invention, the manner in which it is constructed and operated and the advantages and useful results attained; the new and useful structures, devices, elements, arrangements, parts, combinations, systems, equipment, operations, methods and relationships are set forth in the appended claims.

We claim:

1. A banking machine apparatus moving sheets from a source in an interior area of the apparatus to an outlet, comprising:

- a movable belt flight extending in said apparatus between said source and said outlet;
- a gate member extending intermediate of said source and said outlet, wherein said gate member is rotatably mounted in supported relation on said apparatus about a pivot, and wherein said gate member has a slot, and wherein in a first position of said gate member said belt flight extends in said slot, and wherein said gate member includes an edge and wherein in said first position said edge extends further radially outward from said pivot than said belt flight; and
- wherein when said belt flight moves in an outward direction and said source delivers a sheet adjacent said gate member, said sheet is engaged with said gate member and belt flight, and wherein said force of said engaged sheet and belt flight rotate said gate member about said pivot to a second position, wherein said sheet moves past said gate member toward said outlet in engaged relation with said belt flight.

2. The apparatus according to claim 1 and further comprising means for biasing said gate member toward said first position, wherein when said belt flight moves said sheet in an opposed inward direction, said sheet engages said gate member and is directed by said gate member to a storage location in said machine.

3. The apparatus according to claim 1 and further comprising a stop in operative connection with said gate member, wherein said rotation of said gate member by said engaged sheet and belt flight is limited by said stop.

4. The apparatus according to claim 1 wherein said gate member in cross-section comprises an arcuate outside surface extending adjacent said edge and wherein said sheet engages said outside surface to move said gate member to the second position.

5. The apparatus according to claim 1 wherein said gate member comprises an arcuate inside surface extending adjacent said edge, and wherein when said first belt flight moves said sheet in an opposed inward direction, said sheet engages said inside surface and moves in supported relation thereon.

6. The apparatus according to claim 1 wherein said gate member comprises a generally arcuate profile in cross-section.

7. The apparatus according to claim 1 wherein said gate member in cross-section has a generally arcuate profile wherein said arcuate profile extends about an arc center, and wherein said pivot is disposed away from arc center.

8. The apparatus according to claim 7 wherein said profile is bounded by a pair of spaced end walls and wherein said gate member is pivotally supported on said end walls.

9. The apparatus according to claim 7 wherein said gate member comprises in cross-section generally concentric inside and outside surfaces, and wherein said slot extends transversely between said surfaces, and wherein gravity biases said gate member toward the first position.

10. The apparatus according to claim 1, wherein said transport comprises two transversely disposed belt flights extending between said source and said outlet, and wherein said gate member comprises two transversely disposed slots, wherein one of said belt flights extends in one of said slots.

11. The apparatus according to claim 10 and further comprising a supporting projection extending generally parallel to and between said belt flights, wherein said sheet is movable in engaged relation with said belt flights and said supporting projection, and further comprising a roller, said roller extending generally transversely of said belt flights and rotatable in engaged relation therewith, and wherein in the second position of said gate member, said edge is in close proximate relation with said roller, and wherein said roller includes a radially extending recess, and wherein said supporting projection extends in said recess.

12. The apparatus according to claim 1 and further comprising a supporting member disposed between said gate member and said outlet, wherein said supporting member is in supporting relation with said belt flight, and wherein when said gate member is in the second position, said edge is in close adjacent relation with said supporting member.

13. The apparatus according to claim 12 wherein said supporting member comprises a roller and wherein said roller rotates responsive to movement of said belt flight.

14. The apparatus according to claim 12 and further comprising a path extending between said supporting member and said outlet, wherein said path has a distance, and wherein said sheet has a length, and wherein said sheet length is less than said path distance.

15. The apparatus according to claim 1 and further comprising:

- a drive, wherein said drive is in operative connection with said belt flight and is operative to selectively move said belt flight in said outward direction or in an opposed inward direction;
- a sensor adjacent said outlet, wherein said sensor senses said sheet adjacent said outlet; and
- a controller in operative connection with said drive and said sensor, wherein said controller is operative to control said drive to move said belt flight in an inward direction responsive to said sensor.

16. The apparatus according to claim 15 wherein said controller is in operative connection with a timer, and wherein said timer is operative to commence timing responsive to said sensor, and wherein said drive is operative responsive to said timer to move said belt flight in an inward direction.

17. The apparatus according to claim 1 wherein said gate member includes an inside surface, and wherein said inside surface extends arcuately generally 180 degrees from said edge, and wherein said inside surface terminates at a location, and wherein when said belt flight moves said sheet in an opposed inward direction from said outlet, said sheet engages said inside surface and is moved in supported relation with said inside surface to said location.

18. The apparatus according to claim 1 and further comprising a fascia, and wherein said fascia comprises an opening therethrough, and wherein said opening is adjacent said outlet, and wherein a sheet at said outlet is manually accessible through said opening.

19. The apparatus according to claim 1 wherein said sheet comprises a transaction receipt and wherein said source comprises a printer.

20. The apparatus according to claim 1 and further comprising a drive in operative connection with said belt flight, and further comprising a sensor adjacent said gate member, and wherein said sensor senses a condition indicative of said sheet being delivered from said source, and wherein said drive is operative responsive to said condition to move said belt flight in the outward direction.

21. A banking machine apparatus, including a transport moving sheets from a source to an outlet and retracting sheets from said outlet to a location in said machine, comprising:

a movable driving member in supported relation with said apparatus, wherein said driving member has a first side facing in a first direction, wherein said sheets are movable in engaged relation with said first side, and wherein when said driving member moves in an outward direction said driving member urges said sheets to move away from said source and toward said outlet;

a gate member movably mounted in supported relation with said apparatus, wherein said gate member includes an outside surface, an inside surface and a slot extending transversely between said outside and inside surfaces, and wherein said outside surface of said gate member includes a first portion and a second portion, wherein said slot extends in said first portion and wherein said second portion is disposed away from said slot, and wherein in a first position of said gate member said driving member extends in said slot and said inside surface extends beyond said second surface in a second direction opposed of said first direction, and wherein a nip extends adjacent said outside surface and said slot; and wherein when said source delivers a sheet to said nip and said driving member moves in said outward direction, said driving member and said gate member engage said sheet and said gate member moves responsive to a force of said engaged sheet acting on said gate member to a second position, wherein said sheet passes between said driving member and said second portion of said gate member.

22. The apparatus according to claim 21 wherein said inside surface of said gate member extends between said driving member and the storage location, and wherein when said sheet moves in an inward direction away from said outlet, said inside surface guides said sheet in supporting relation therewith to said storage location.

23. A banking machine apparatus comprising:

a sheet source housed in said interior area of the apparatus;

an outlet, whereby a sheet at said outlet is accessible to a user of the machine;

a selectively movable driving mechanism, wherein said driving mechanism moves a sheet in engaged relation therewith, said driving mechanism extending between said source and said outlet;

a gate member in movably supported relation with said apparatus, said gate member positioned between said source and said outlet, wherein said gate member includes an outside surface and an inside surface, and wherein said gate member comprises a slot extending transversely between said outside and inside surfaces, and wherein in a first position of said gate member said driving mechanism extends in said slot; and wherein movement of said driving mechanism to move said sheet in an outward direction from said source toward said outlet engages a sheet delivered by said source between said outside surface and said driving mechanism, and wherein a force of said engaged sheet moves said gate member in a first direction to a second position, wherein in said second position said sheet passes said gate member in said outward direction in engaged relation with a portion of said outside surface disposed of said slot.

24. The apparatus according to claim 23 and further comprising a biasing means for biasing said gate member toward the first position, wherein said inside surface blocks passage of the sheet moving in an opposed direction, and wherein said inside surface engages said sheet and guides it toward a location in said interior area.

25. The apparatus according to claim 24 and further comprising a movable supporting member, wherein said supporting member moves in operatively engaged relation with said driving mechanism, and wherein when said gate member is in the second position, said outside surface is in close adjacent relation with said supporting member, and wherein when said gate member is in the first position, said gate member is disposed from said supporting member by a gap, and wherein sheets passing to said location pass through said gap.

26. The apparatus according to claim 25 and further comprising a supporting projection extending generally parallel to said driving mechanism and between said supporting member and said outlet, wherein said sheet is movable in engagement with said supporting projection and wherein said supporting member comprises a recess, and wherein said supporting projection extends in said recess.

27. The apparatus according to claim 23 and further comprising a sensor adjacent said outlet, and a timer in operative connection with said sensor, wherein a sheet is moved in an opposed direction by said driving mechanism responsive to said sensor and said timer.

28. The apparatus according to claim 23 and further comprising a sensor adjacent said gate member, wherein said sensor senses a condition indicative of a sheet delivered by said sheet source, and wherein said driving mechanism is operative responsive to said sensor to move in the outward direction.

29. The apparatus according to claim 23 wherein said sheet source includes a printer, and wherein said driving mechanism is operative responsive to said printer to move said driving mechanism in the outward direction.

30. The apparatus according to claim 23 wherein said gate member in cross-section includes an arcuate profile, and wherein said gate member is movably supported by an off-center pivot.

31. The apparatus according to claim 23 wherein movement of said gate member in the first direction is limited by a stop, and wherein said gate member is biased to the first position by gravity.

32. The apparatus according to claim 23 and further comprising:

a controller, wherein said controller is operative to cause movement of said driving mechanism;

a sensor in operative connection with said controller, wherein said sensor is operative to sense a surface of said sheet when in engagement with said driving mechanism, and wherein said sensor is operative to generate a signal responsive to sensing said sheet surface, and wherein said controller is operative to compare a quantity corresponding to said sensor signals to a stored value, wherein said controller is operative to control movement of said driving mechanism responsive to said quantity and said stored value having a predetermined relationship.

33. The apparatus according to claim 32 wherein said controller is operative to establish said stored value responsive to sensor signals generated responsive to the surface of a first sheet in engagement with said driving mechanism.

34. The apparatus according to claim 32 wherein said controller is operative to adjust said stored value responsive to sensor signals generated from each sheet in engagement with said driving mechanism.

35. The apparatus according to claim 34 wherein said controller is operative to adjust said stored value responsive to sensor signals corresponding to at least two locations on each sheet.

36. The apparatus according to claim 32 wherein said sheets include sheets with a TOF indicator and sheets without a TOF indicator, and wherein said stored value is indicative of sensor signals from a form including a TOF indicator, and wherein said controller is operative responsive to sensing said sensor signal corresponding to a TOF indicator to cause said driving mechanism to move in a manner responsive to said TOF indicators on said sheets.

37. The apparatus according to claim 36 wherein said controller is operative to adjust said stored value responsive to a sensor signal generated responsive to said sensor sensing said TOF indicator.

38. A banking machine apparatus comprising:

a sheet source means for providing a sheet therefrom;

a movable member means for moving said sheet in engaged relation therewith from said source means to an outlet, whereby a user of said apparatus may access the sheet at said outlet;

a gate means for enabling said sheet to pass said gate means in an outward direction from said source means toward said outlet and for preventing said sheet from moving in an opposed direction to said source means, and wherein said gate means engages said sheet moving in said opposed direction and guides said sheet toward a location, and wherein said gate means is in movably supported relation with said apparatus and said gate means is movable between first and second positions, and wherein said gate means includes a slot, and wherein said movable member means extends in said slot in said first position of said gate means, and wherein said gate means is movable to said second position responsive to engagement of said sheet with said gate means and said movable member means, and wherein in the second position of said gate means, said sheet is enabled to pass said gate means in said outward direction in supported relation with said gate means and said movable member means.

39. The apparatus according to claim 38 and further comprising mounting means for rotatably mounting said gate means in supported relation with said apparatus, and wherein said first position is angularly disposed from said second position.

40. The apparatus according to claim 38 and further comprising biasing means for biasing said gate means toward said first position, and stop means for restricting movement of said gate means in a direction from said first position beyond said second position.

41. The apparatus according to claim 38 and further comprising sensing means for sensing said sheet adjacent said outlet and for moving said movable member means in said opposed direction responsive to said sensor means.

42. A banking machine apparatus comprising:

a sheet source housed in an interior area of said apparatus, wherein said sheet source delivers a sheet;

a frame, wherein said frame is rotatably mounted in supported relation on said apparatus, wherein in a first rotational frame position, said frame extends between said source and an outlet, and in a second rotational frame position a sheet storage location disposed intermediate of said source and said outlet is manually accessible;

a movable belt flight supported on said frame, wherein said belt flight extends between said source and said outlet in the first frame position;

a movable gate member disposed intermediate of said source and said storage location, in said first frame position, wherein said gate member has an outside surface in facing relation with said source, and an inside surface in facing relation with said outlet; and wherein in a first gate member position said outside surface and said belt flight define a nip wherein said sheet is engageable with said belt flight and said gate member when said belt flight moves in an outward direction, and wherein upon engagement of said sheet, said gate member moves to a second position wherein said sheet is enabled to pass said gate member in said outward direction, and wherein after passage of said sheet, said gate member returns to said first position, and wherein a sheet moving in an opposed direction engages at inside surface of said gate member and is directed toward the storage location.

43. The apparatus according to claim 42 wherein said inside surface extends generally 180 degrees.

44. The apparatus according to claim 42 wherein said gate member includes a slot extending transversely between said outside surface and said inside surface, and wherein in said first gate member position said belt flight extends in said slot.

45. The apparatus according to claim 42 wherein said gate member is rotationally movably mounted in supported connection with said apparatus.

46. The apparatus according to claim 42 and further comprising a pulley in supported connection with said frame, wherein said pulley is positioned adjacent to said outlet, and wherein said belt flight is in supported connection with said pulley, and wherein said pulley is journaled on a shaft, and wherein said frame is rotatably movably supported on said shaft.

47. The apparatus according to claim 46 wherein said storage location is disposed in said apparatus vertically below said frame and said outlet.

48. A method of operating a banking machine comprising the steps of:

delivering a sheet from a source in an interior area of said machine;

engaging said sheet between a gate member movably supported on said machine and a belt flight moving in an outward direction, wherein said sheet is engaged in a first position of said gate member, wherein in said first position said belt flight extends in a slot in said gate member;

moving said gate member to a second position in reaction to a force of said engaged sheet thereon, wherein in the second position said belt flight is disposed from said slot, and wherein said sheet passes said gate member moving in the outward direction in engaged relation with said belt flight and said gate member.

49. The method according to claim 48 and further comprising the step of returning said gate member from the second position to the first position after said sheet passes said gate member.

50. The method according to claim 49 wherein said gate member includes an inside surface, and wherein said slot and said belt flight extend through said inside surface in the first position of said gate member, and further comprising the step of reversing the movement of said belt flight to move in an opposed direction wherein said sheet moves in said opposed direction and engages said inside surface, and directing said sheet in supported relation with said inside surface toward a location in said interior area of the machine.

51. The method according to claim 50 and after said step of moving said gate member to the second position further comprising the step of delivering said sheet to an outlet, wherein said sheet is accessible to a user of said apparatus, and prior to said reversing step further comprising steps of sensing with a sensor said sheet at said outlet and timing with a timer in operative connection with a sensor a time said sheet is present at said outlet, and initiating said reversing step responsive to said timer.

52. The method according to claim 51 wherein said delivering step from said source comprises printing on said sheet.

53. The method according to claim 48 wherein said moving step comprises rotatably moving said gate member about a pivot.

54. The method according to claim 48 and prior to said engaging step, further comprising the step of sensing with a sensing means said sheet being delivered from said source, and commencing movement of said belt flight in the outward direction responsive to sensing the sheet with said sensing means.

55. The method according to claim 48 and further comprising the step of passing said sheet between a rotatably moving supporting member and said belt flight as said sheet passes from engaged relation with said gate member.

56. A method of operating a banking machine comprising the steps of:

delivering a sheet from a sheet source located inside the machine;

engaging said delivered sheet with a belt flight moving in a longitudinally outward direction;

moving said sheet in the outward direction past a gate member, wherein said gate member moves from a first position wherein the belt extends in a slot in the gate member, to a second position to enable said sheet to pass in the outward direction;

further moving said sheet in the outward direction in engaged relation with the belt flight to an outlet, wherein said sheet is accessible at said outlet;

moving said sheet from said outlet in a longitudinally opposed direction in engaged relation with said belt flight;

engaging said sheet moving in said opposed direction with said gate member;

directing said sheet with said gate member toward a storage location in said machine, wherein when said sheet is deposited in said storage location said belt flight extends in overlying relation of said storage location and said sheet;

moving said belt flight in a first direction transverse of said longitudinal direction to a second position, wherein in the second position the belt flight does not extend in overlying relation of the storage location whereby said storage location is accessible.

57. The method according to claim 56 and further comprising the step of manually removing said sheet from said storage location.

58. The method according to claim 57 and further comprising the step of moving said belt flight transversely to the first sheet transporting position after removal of said sheet.

59. A method of operating a banking machine wherein said machine delivers a sheet from a sheet source located in the machine; engages said delivered sheet with a belt flight in a sheet transporting position and moving in a longitudinal outward direction; moves said sheet in said outward direction past a gate, wherein said gate moves from a first position wherein the belt flight extends in a slot in the gate member, to a second position to enable said sheet to pass in the outward direction; further moves said sheet in the outward direction in engaged relation with the belt flight to an outlet, whereby said sheet is accessible to a user at said outlet; moves said sheet from said outlet in a longitudinally opposed direction in engaged relation with said belt flight; engages said sheet moving in said opposed direction with said gate; and directs said sheet with said gate toward a storage location in said machine, comprising the steps of:

moving said belt flight from the sheet transporting position wherein the belt flight overlies the storage location and the sheet in the storage location in a direction transverse of said longitudinal direction to a service position wherein said belt flight does not overlie the storage location, whereby said storage location is further accessible;

manually removing said sheet from said storage location; and returning said belt flight transversely to its sheet transporting position overlying the storage location after removal of said sheet.

* * * * *